US012775156B2

(12) United States Patent
Shim et al.

(10) Patent No.: US 12,775,156 B2
(45) Date of Patent: Oct. 27, 2026

(54) OPTICAL SYSTEM AND CAMERA MODULE COMPRISING SAME

(71) Applicant: LG INNOTEK CO., LTD., Seoul (KR)

(72) Inventors: Hyung Rok Shim, Seoul (KR); Nam Hoon Oh, Seoul (KR); Dae Sik Jang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 446 days.

(21) Appl. No.: 18/043,167

(22) PCT Filed: Aug. 23, 2021

(86) PCT No.: PCT/KR2021/011170

§ 371 (c)(1),
(2) Date: Feb. 27, 2023

(87) PCT Pub. No.: WO2022/045690

PCT Pub. Date: Mar. 3, 2022

(65) Prior Publication Data

US 2023/0333357 A1 Oct. 19, 2023

(30) Foreign Application Priority Data

Aug. 26, 2020 (KR) ........................ 10-2020-0107947

(51) Int. Cl.
*G02B 15/20* (2006.01)
*G02B 15/14* (2006.01)

(52) U.S. Cl.
CPC ........... *G02B 15/20* (2013.01); *G02B 15/143* (2019.08)

(58) Field of Classification Search
CPC .............................. G02B 15/20; G02B 15/143
See application file for complete search history.

(56) References Cited

U.S. PATENT DOCUMENTS 6,333,822 B1 12/2001 Ohtake
2004/0051960 A1 3/2004 Mihara
(Continued)

FOREIGN PATENT DOCUMENTS

JP 58-117514 A 7/1983
JP 2006-3548 A 1/2006
(Continued)

OTHER PUBLICATIONS

WO-2020157905-A1, translation (Year: 2020).*
(Continued)

*Primary Examiner* — Wen Huang
(74) *Attorney, Agent, or Firm* — SALIWANCHIK, LLOYD & EISENSCHENK

(57) ABSTRACT

A zoom optical system according to an embodiment of the present invention comprises a first lens group, a second lens group and a third lens group sequentially aligned from an object toward an image, wherein the second lens group and third lens group can move, and an effective focal length (EFL) at a wide angle is defined by the mathematical formula below.

$$2.9 < \frac{EFL_{wide}}{H_{imageD}} < 3.5$$

Here, $EFL_{wide}$ means an effective focal length of the zoom optical system at a wide angle, and $H_{imageD}$ means a half of the diagonal length of an image sensor pixel area.

20 Claims, 14 Drawing Sheets

(56) References Cited

U.S. PATENT DOCUMENTS

| | | | | |
|---|---|---|---|---|
| 2007/0171542 | A1 | 7/2007 | Chuang et al. | |
| 2011/0228407 | A1 | 9/2011 | Yamaguchi | |
| 2014/0022417 | A1 | 1/2014 | Yokoyama et al. | |
| 2014/0355130 | A1 | 12/2014 | Takemoto | |
| 2015/0362712 | A1* | 12/2015 | Yabe | G02B 13/009 359/689 |
| 2017/0242226 | A1 | 8/2017 | Kubota | |

FOREIGN PATENT DOCUMENTS

| | | | | |
|---|---|---|---|---|
| JP | 2006-338023 | A | 12/2006 | |
| JP | 2011197302 | A | 10/2011 | |
| KR | 101837371 | B1 | 3/2018 | |
| KR | 10-2019-0088700 | A | 7/2019 | |
| KR | 10-2020-0085205 | A | 7/2020 | |
| WO | 2020/141902 | A1 | 7/2020 | |
| WO | WO-2020157905 | A1 * | 8/2020 | G02B 15/20 |

OTHER PUBLICATIONS

International Search Report, dated Nov. 22, 2021, issued in Application No. PCT/KR2021/011170.

Supplementary European Search Report dated Jan. 19, 2024 in European Application No. 21861987.2.

Office Action dated Oct. 23, 2025 in Korean Application No. 10-2020-0107947.

Office Action dated Jul. 1, 2025 in Japanese Application No. 2023-513512.

* cited by examiner

OPTICAL SYSTEM AND CAMERA MODULE COMPRISING SAME

CROSS-REFERENCE TO RELATED APPLICATIONS

This application is the U.S. national stage application of International Patent Application No. PCT/KR2021/011170, filed Aug. 23, 2021, which claims the benefit under 35 U.S.C. § 119 of Korean Application No. 10-2020-0107947, filed Aug. 26, 2020, the disclosures of each of which are incorporated herein by reference in their entirety.

TECHNICAL FIELD

Embodiments relate to an optical system and a camera module including the same.

BACKGROUND ART

As the performance of a camera module embedded in a portable terminal is developed, an auto-focusing function is also required for the camera module in the portable terminal.

In order for the camera module in the portable terminal to have the auto-focusing function, a magnification may be increased through digital processing in a process in which external light is converted into a digital image or digital video. Accordingly, it is possible to zoom only with a predetermined magnification such as 1 time, 3 times, and 5 times, and as the magnification is increased, there is a problem in that resolution is lowered and digital degradation occurs.

Meanwhile, in order for the camera module in the portable terminal to have the auto-focusing function, a technology of moving a lens to adjust a distance between the lens and an image sensor is being attempted. However, it is not easy to design an optical system capable of moving in a small space in the portable terminal.

DISCLOSURE

Technical Problem

The present invention is directed to providing a zoom optical system and a camera module including the same.

Objectives to be solved by the embodiment are not limited to the above-described objective and will include objectives and effectiveness which may be identified by solutions for the objectives and the embodiments described below.

Technical Solution

A zoom optical system according to an embodiment of the present invention includes a first lens group, a second lens group, and a third lens group, which are sequentially arranged from an object side to an image side, wherein the second lens group and the third lens group are movable, and an effective focal length (EFL) in a wide angle is defined by the following equation, $$2.9 < \frac{EFL_{wide}}{H_{imageD}} < 3.5$$

where, $EFL_{wide}$ refers to the effective focal length of the zoom optical system in the wide angle, and $H_{imageD}$ refers to a half value of a diagonal length of an image sensor pixel area.

The first lens group may include three or less lenses, the second lens group may include two or less lenses, and the third lens group may include two or less lenses.

An effective focal length in a telephoto may be defined by the following equation, $$4.3 < \frac{EFL_{tele}}{H_{imageD}} < 5.1$$

where, $EFL_{tele}$ may refer to the effective focal length of the zoom optical system in the telephoto, and $H_{imageD}$ may refer to the half value of the diagonal length of the image sensor pixel area.

During zooming from the wide angle to a telephoto, a movement stroke of the second lens group may be defined by the following equation, $$8 < \frac{TTL}{STROKE_2} < 9$$

where, TTL may refer to a distance from a surface of an image sensor to a first surface of the zoom optical system, and $STROKE_2$ may refer to the movement stroke of the second lens group.

During zooming from the wide angle to a telephoto, a movement stroke of the third lens group may be defined by the following equation, $$6 < \frac{TTL}{STROKE_3} < 7$$

where, TTL may refer to a distance from a surface of an image sensor to a first surface of the zoom optical system, and $STROKE_3$ may refer to the movement stroke of the third lens group.

Each of the first to third lens groups may include a plastic lens.

A maximum diameter of a plurality of lenses included in the first lens group, and a maximum diameter of a plurality of lenses included in the second lens group and the third lens group may be defined by the following equation, $$0.85 < \frac{APER_{fix}}{APER_{mov}} < 1.1$$

where, $APER_{fix}$ may refer to the maximum diameter of the lens included in the first lens group, which is a fixed group, and $APER_{mov}$ may refer to the maximum diameter of the lens included in the second lens group and the third lens group which are moving groups.

A chief ray angle (CRA) may be greater than −20° and less than −10°.

The zoom optical system may further include a right-angle prism disposed in front of the first lens group.

The zoom optical system may further include a dummy lens disposed in rear of the third lens group.

An effective diameter of the dummy lens may be greater than an effective diameter of the first lens group.

A zoom optical system according to another embodiment of the present invention includes a first lens group, a second lens group, and a third lens group, which are sequentially arranged from an object side to an image side, wherein the second lens group and the third lens group are movable, and an effective focal length in a telephoto is defined by the following equation, $$4.3 < \frac{EFL_{tele}}{H_{imogeD}} < 5.1$$

where, $EFL_{tele}$ refers to the effective focal length of the zoom optical system in the telephoto, and $H_{imageD}$ refers to a half value of a diagonal length of an image sensor pixel area.

A zoom optical system according to still another embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, a movement stroke of the second lens group is less than 2 mm, and in a state in which a distance from a surface of an image sensor to a first surface of the zoom optical system is less than 17 mm, the zoom optical system is defined by the following equation in corresponding to the movement stroke of the second lens group, which is less than 2 mm, $$1.3 < \frac{EFL_{tele}}{EFL_{wide}} < 1.7$$

where, $EFL_{tele}$ refers to an effective focal length in a telephoto, and $EFL_{wide}$ refers to an effective focal length in a wide angle.

A zoom optical system according to yet another embodiment of the present invention includes a zoom optical system including a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, an focal length is greater than 14 mm in a telephoto, and the f-number is less than 3 in the telephoto.

A zoom optical system according to yet another embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, an focal length is less than 10 mm in a wide angle, and the f-number is less than 2.3 in the wide angle.

A zoom optical system according to yet another embodiment of the present invention includes a zoom optical system including a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, and a diagonal length of a pixel area of an image sensor disposed in rear of the third lens group is greater than 6 mm.

Advantageous Effects

According to embodiments of the present invention, an optical system capable of zooming at a high magnification in addition to a low magnification and a camera module including the same can be obtained. In the optical system according to an embodiment of the present invention, zooming can be continuously adjusted, and a high resolution can be maintained even with a high magnification.

MODES OF THE INVENTION

Hereinafter, exemplary embodiments of the present invention will be described in detail with reference to the accompanying drawings.

However, the technical spirit of the present invention is not limited to some embodiments which will be described and may be implemented in various forms, and one or more components in the embodiments may be selectively combined and replaced to be used within the scope of the technical spirit of the present invention.

Further, the terms used in the embodiments of the present invention (including technical and scientific terms) may be interpreted with meanings that are generally understood by those skilled in the art unless particularly defined and described, and terms which are generally used, such as terms defined in a dictionary, may be understood in consideration of their contextual meanings in the related art.

Further, the terms used in the embodiments of the present invention are provided only to describe embodiments of the present invention and not for purposes of limitation.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, terms such as first, second, A, B, (a), (b), and the like may be used to describe components of the embodiments of the present invention.

These terms are only provided to distinguish the components from other components, and the essence, sequence, order, or the like of the components are not limited by the terms.

In addition, when a component is described as being "connected," "coupled," or "linked" to another component, the component may include not only a case of being directly connected, coupled, or linked to another component but also a case of being connected, coupled, or linked to another component by still another component between the component and another component.

Further, when a component is described as being formed "on (above)" or "under (below)" another component, the term "on (above)" or "under (below)" includes both of a case in which two components are in direct contact with each other or a case in which one or more components are (indirectly) disposed between two components. In addition, when a component is described as being disposed "on or under" another component, such a description may include a case in which the component is disposed at an upper side or a lower side with respect to another component.

Figure 1:
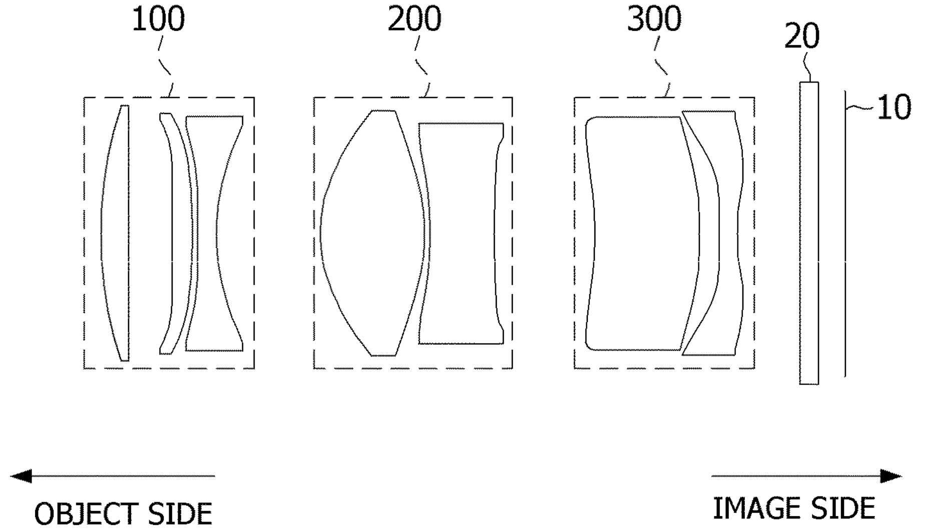
FIG. 1 illustrates a zoom optical system according to an embodiment of the present invention.

FIG. 1 illustrates a zoom optical system according to an embodiment of the present invention.

Referring to FIG. 1, the zoom optical system according to the embodiment of the present invention includes a first lens group 100, a second lens group 200, and a third lens group 300, which are sequentially arranged from an object side to an image side. A right-angle prism may be further disposed in front of the first lens group 100. In this case, the zoom optical system may include the right-angle prism, the first lens group 100, the second lens group 200, and the third lens group 300 which are sequentially arranged from the object side to the image side.

According to the embodiment of the present invention, the first lens group 100 includes a plurality of lenses. The first lens group 100 may include at least three or less lenses. When the first lens group 100 includes one or two lenses, it may be difficult to correct resolution at maximum magnification, and when the first lens group 100 includes three or more lenses, an overall size of the zoom optical system may be increased, and thus the first lens group 100 may preferably include three lenses.

The first lens group 100 is fixed with respect to the image side. The first lens group 100 is fixed with respect to a surface of a sensor 10. That is, the plurality of lenses are fixed with respect to the image side.

The second lens group 200 includes a plurality of lenses. The second lens group 200 may include at least two or less lenses. When the second lens group 200 includes one lens, it may be difficult to correct resolution at maximum magnification, and when the second lens group 200 includes three or more lenses, an overall size of the zoom optical system may be increased, and thus the second lens group 200 may preferably include two lenses.

The second lens group 200 is movable. The plurality of lenses included in the second lens group 200 are movable together along a central axis of the lenses. The two lenses included in the second lens group 200 are movable along the central axis of the lenses. When the second lens group 200 includes three or more lenses, the size and weight of the second lens group 200 are increased, and driving power may be increased when the second lens group 200 moves. Accordingly, the second lens group 200 preferably includes two lenses. A focal length may be continuously adjusted as the second lens group 200 moves. A magnification may be continuously adjusted as the second lens group 200 moves. Accordingly, the second lens group 200 may serve as a zooming group.

The third lens group 300 includes a plurality of lenses. The third lens group 300 may include at least two or less lenses. When the third lens group 300 includes one lens, it may be difficult to correct resolution at maximum magnification, and when the third lens group 300 includes three or more lenses, an overall size of the zoom optical system may be increased, and thus the third lens group 300 may preferably include two lenses.

The third lens group 300 is movable. The plurality of lenses included in the third lens group 300 are movable together along a central axis of the lenses. The two lenses included in the third lens group 300 are movable along the central axis of the lenses. When the third lens group 300 includes three or more lenses, the size and weight of the third lens group 300 are increased, and driving power may be increased when the third lens group 300 moves. Accordingly, the third lens group 300 preferably includes two lenses. A focus may be adjusted as the third lens group 300 moves. The third lens group 300 may serve as a focusing group.

According to the embodiment of the present invention, a filter 20 and the image sensor 10 may be sequentially arranged in rear of the third lens group 300. Here, the filter 20 may be an infrared (IR) filter. Accordingly, the filter 20 may block near IR light, for example, light having a wavelength of 700 nm to 1100 nm, from light incident into the camera module. In addition, the image sensor 10 may be connected to a printed circuit board by a wire.

The filter 20 may include a foreign material prevention filter and an IR filter sequentially disposed from the object side to the image side. When the filter 20 includes the foreign material prevention filter, a foreign material generated while the third lens group 300 moves may be prevented from being introduced into the IR filter or the image sensor 10.

A magnification of the zoom optical system may be changed as the second lens group 200 and the third lens group 300 move. For example, the magnification of the zoom optical system may increase or decrease continuously between 3 to 5 times as the second lens group 200 and the third lens group 300 move. According to the embodiment, the zoom optical system may have a magnification of 3 times in a wide angle, and may have a magnification of 5 times in a telephoto. Meanwhile, the continuous increase or decrease in the magnification does not mean an intermittent increase or decrease in the magnification in a digital manner but may refer to a linear decrease or decrease therein.

Each of the second lens group 200 and the third lens group 300 may move independently. For example, when the wide angle is changed to the telephoto, a distance between the second lens group 200 and the third lens group 300 may increase in a direction from a movement start point (wide angle) to a predetermined point and decrease in a direction from the predetermined point to a movement end point (telephoto).

An effective focal length (EFL) of the zoom optical system according to the embodiment of the present invention will be described.

An effective focal length of the zoom optical system in the telephoto may be represented by Equation 1 below, $$4.3 < \frac{EFL_{tele}}{H_{imageD}} < 5.1 \qquad \text{Equation 1}$$

where, $EFL_{tele}$ refers to the effective focal length of the zoom optical system in the telephoto, and $H_{imageD}$ refers to a half value of a diagonal length of an image sensor pixel area. The unit may be mm. The image sensor pixel area may refer to an area in which pixels that receive light are arrayed in the image sensor. The image sensor pixel area may be an area excluding a circuit area for converting received light into an electrical signal, a housing portion according to packaging, and the like from the entire area of the image sensor.

According to one embodiment of the present invention, in the zoom optical system, the effective focal length may be greater than 14 mm and the f-number may be less than 3, in the telephoto. The half value of the diagonal length of the image sensor pixel area may be greater than 3 mm. The diagonal length of the image sensor pixel area may be greater than 6 mm.

An effective focal length of the zoom optical system in the wide angle may be represented by Equation 2 below, $$2.9 < \frac{EFL_{wide}}{H_{imogeD}} < 3.5 \qquad \text{Equation 2}$$

where, $EFL_{wide}$ refers to the effective focal length of the zoom optical system in the wide angle, and $H_{imageD}$ refers to the half value of the diagonal length of the image sensor pixel area.

According to one embodiment of the present invention, in the zoom optical system, the effective focal length may be less than 10 mm and the f-number may be less than 2.3, in the wide angle. The half value of the diagonal length of the image sensor pixel area may be greater than 3 mm. The diagonal length of the image sensor pixel area may be greater than 6 mm.

A movement stroke of the zoom optical system according to the embodiment of the present invention will be described. The movement stroke may refer to a distance in which the lens group is movable by a driving part.

A movement stroke of the second lens group 200 may be represented by Equation 3 below, $$8 < \frac{TTL}{STROKE_2} < 9 \qquad \text{Equation 3}$$

where, a total track length (TTL) may refer to a distance from the surface of the image sensor to a first surface of the zoom optical system. For example, the TTL may refer to a distance from one surface, which is closest to the object side, of the first lens group 100 to an upper surface of the image sensor 10 on which light is incident. In the present specification, the TTL is interchangeable with a total length. STROKE may refer to the movement stroke of the second lens group 200. The unit may be mm. According to one embodiment of the present invention, in the zoom optical system, the TTL may be less than 17 mm, and the movement stroke of the second lens group 200 may be less than 2 mm.

In a state in which the distance from the surface of the image sensor to the first surface of the zoom optical system is less than 17 mm, the zoom optical system according to the embodiment of the present invention may be defined by Equation 4 below in corresponding to the movement stroke of the second lens group, which is less than 2 mm, $$1.3 < \frac{EFL_{tele}}{EFL_{wide}} < 1.7 \quad \text{Equation 4}$$

where, $EFL_{tele}$ refers to the effective focal length in the telephoto, and $EFL_{wide}$ refers to the effective focal length in the wide angle.

A movement stroke of the third lens group 300 may be represented by Equation 5 below, $$6 < \frac{TTL}{\text{STROKE}_3} < 7 \quad \text{Equation 5}$$

where, TTL may refer to a distance from the surface of the image sensor to the first surface of the zoom optical system. $\text{STROKE}_3$ may refer to the movement stroke of the third lens group 300. The unit may be mm.

When the movement stroke is large, the driving part for moving the second lens group 200 and the third lens group 300 is increased in size, and thus it is difficult to mount the driving part in a portable terminal. However, since the driving part can be implemented in a small size by implementing the movement stroke to be about ⅙ to ⅕ compared to the TTL, the camera module can be miniaturized.

An aperture of the lens of the zoom optical system according to the embodiment of the present invention will be described.

According to the embodiment of the present invention, an aperture of each of the second lens group 200 and the third lens group 300 may be less than an aperture of the first lens group 100. This may be represented by Equation 6 below, $$0.85 < \frac{APER_{fix}}{APER_{mov}} < 1.1 \quad \text{Equation 6}$$

where, $APER_{fix}$ may refer to a maximum diameter of a lens included in the first lens group 100, which is a fixed group, and $APER_{mov}$ may refer to a maximum diameter of a lens included in the second lens group 200 and the third lens group 300 which are moving groups. For example, when a diameter of a first lens 110 among the lenses included in the first lens group 100, which is a fixed group, is the largest, $APER_{fix}$ may refer to the diameter of the first lens 110. When a diameter of a fourth lens 210 among the lenses included in the second lens group 200 and the third lens group 300, which are moving groups, is the largest, $APER_{mov}$ may refer to the diameter of the fourth lens 210.

A weight of the second lens group 200 and the third lens group 300 may be reduced by implementing the diameter of each of the second lens group 200 and the third lens group 300 to be smaller than that of the first lens group 100. Accordingly, power consumption may be reduced when the second lens group 200 and the third lens group 300, which are moving groups, move.

According to the embodiment of the present invention, each of the first to third lens groups 100 to 300 may include a plastic lens.

According to the embodiment of the present invention, in the zoom optical system, a chief ray angle (CRA) may be greater than −20° and less than −10°. An angle of light incident on the image sensor 10, that is, an image surface, may be greater than −20° and less than −10°. That is, the CRA of the zoom optical system according to the embodiment of the present invention may have any one value among values between −20° and −10°.

Figure 2:
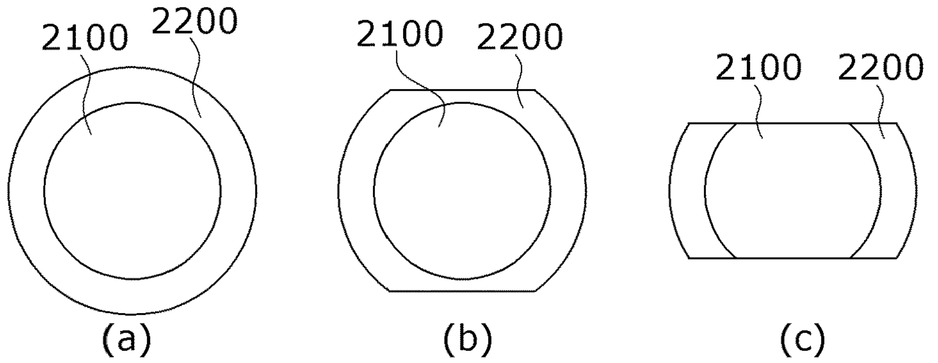
FIG. 2 is a view for describing lenses to which a D-cut technique is applied according to the embodiment of the present invention.

FIG. 2 is a view for describing lenses to which a D-cut technique is applied according to the embodiment of the present invention.

Referring to FIG. 2, the lenses may each include an effective diameter and a rib disposed around the effective diameter.

FIG. 2A illustrates a lens to which the D-cut technique is not applied. As shown in FIG. 2A, when the D-cut technique is not applied, the effective diameter and the rib of the lens may not be cut.

FIG. 2B illustrates a lens to which the D-cut technique according to one embodiment is applied. As shown in FIG. 2B, when the D-cut technique according to one embodiment is applied, a portion of the rib in the lens may be cut. The effective diameter of the lens to which the D-cut technique according to one embodiment is applied may not be cut.

FIG. 2C illustrates a lens to which the D-cut technique is applied according to another embodiment. As shown in FIG. 2C, when the D-cut technique according to another embodiment is applied, in the lens, a portion of the rib and a portion of the effective diameter may be cut.

Table 1 shows a major-axis length, a minor-axis length, and an effective diameter of the lens according to one embodiment of the present invention.

TABLE 1

| | Major-axis length | Minor-axis length | Effective diameter |
|---|---|---|---|
| First lens | 6 | 5.55 | 5 |
| Second lens | 5.7 | 5.55 | 4.681 |
| Third lens | 5.6 | 5.25 | 4.6 |
| Fourth lens | 6 | 4.8 | 4.8 |
| Fifth lens | 5.8 | 4.8 | 4.315 |
| Sixth lens | 5.6 | 4.79 | 4.2 |
| Seventh lens | 6.1 | 4.8 | 5 |

According to the embodiment of the present invention, the plurality of lenses included in the first to third lens groups 100 to 300 may be lenses to which the D-cut technique is applied. The first lens 110, a second lens 120, a third lens 130, a fourth lens 210, a fifth lens 220, a sixth lens 310, and a seventh lens 320 may be lenses to which the D-cut technique is applied. Each of the plurality of lenses included in the first to third lens groups 100 to 300 may be a D-cut lens in which a portion of an upper side portion and a portion of a lower side portion are cut. Each of the first lens 110, the second lens 120, the third lens 130, the fourth lens 210, the fifth lens 220, the sixth lens 310, and the seventh lens 320 may be a D-cut lens in which a portion of an upper side portion and a portion of a lower side portion are cut. Specifically, the first lens 110 may be a lens to which a D-cut technique in which only a portion of the rib is cut is applied. Referring to Table 2, the first lens 110 may have a major-axis length of 6 mm, a minor-axis length of 5.55 mm, and an effective diameter of 5 mm. That is, since the major-axis length is longer than the minor-axis length, and the minor-axis length is larger than the length of the effective diameter, the first lens 110 may be a lens to which a D-cut technique in which the effective diameter is not cut and a portion of the rib is cut is applied.

The second lens 120 may be a lens to which a D-cut technique in which only a portion of the rib is cut is applied. Referring to Table 2, the second lens 120 may have a major-axis length of 5.7 mm, a minor-axis length of 5.55 mm, and an effective diameter of 4.681 mm. That is, since the major-axis length is longer than the minor-axis length, and the minor-axis length is larger than the length of the effective diameter, the second lens 120 may be a lens to which the D-cut technique in which the effective diameter is not cut and a portion of the rib is cut is applied.

The third lens 130 may be a lens to which the D-cut technique in which only a portion of the rib is cut is applied. Referring to Table 2, the third lens 130 may have a major-axis length of 5.6 mm, a minor-axis length of 5.25 mm, and an effective diameter of 4.6 mm. That is, since the major-axis length is longer than the minor-axis length, and the minor-axis length is larger than the length of the effective diameter, the third lens 130 may be a lens to which the D-cut technique in which the effective diameter is not cut and a portion of the rib is cut is applied.

The fourth lens 210 may be a lens to which the D-cut technique in which only a portion of the rib is cut is applied. Referring to Table 2, the fourth lens 210 may have a major-axis length of 6 mm, a minor-axis length of 4.8 mm, and an effective diameter of 4.8 mm. That is, since the major-axis length is longer than the minor-axis length, and the minor-axis length is equal to the length of the effective diameter, the fourth lens 210 may be a lens to which the D-cut technique in which the effective diameter is not cut and a portion of the rib is cut is applied.

The fifth lens 220 may be a lens to which the D-cut technique in which only a portion of the rib is cut is applied. Referring to Table 2, the fifth lens 220 may have a major-axis length of 5.8 mm, a minor-axis length of 4.8 mm, and an effective diameter of 4.315 mm. That is, since the major-axis length is longer than the minor-axis length, and the minor-axis length is larger than the length of the effective diameter, the fifth lens 220 may be a lens to which the D-cut technique in which the effective diameter is not cut and a portion of the rib is cut is applied.

The sixth lens 310 may be a lens to which the D-cut technique in which only a portion of the rib is cut is applied. Referring to Table 2, the sixth lens 310 may have a major-axis length of 5.6 mm, a minor-axis length of 4.79 mm, and an effective diameter of 4.2 mm. That is, since the major-axis length is longer than the minor-axis length, and the minor-axis length is larger than the length of the effective diameter, the sixth lens 310 may be a lens to which the D-cut technique in which the effective diameter is not cut and a portion of the rib is cut is applied.

The seventh lens 320 may be a lens to which a D-cut technique in which a portion of the rib and a portion of the effective diameter are cut is applied. Referring to Table 2, the seventh lens 320 may have a major-axis length of 6.1 mm, a minor-axis length of 4.8 mm, and an effective diameter of 5 mm. That is, since the major-axis length is longer than the minor-axis length, and the minor-axis length is smaller than the length of the effective diameter, the seventh lens 320 may be a lens to which the D-cut technique in which a portion of the effective diameter and a portion of the rib are cut is applied.

In the case of a circular type lens, there is a problem in that a volume of the lens is increased due to a height in a vertical direction, but as in the embodiment of the present invention, by applying a D-cut to the upper and lower side portions of the plurality of lenses, the height in the vertical direction may be decreased, thereby reducing a volume of the lens.

Figure 3A:
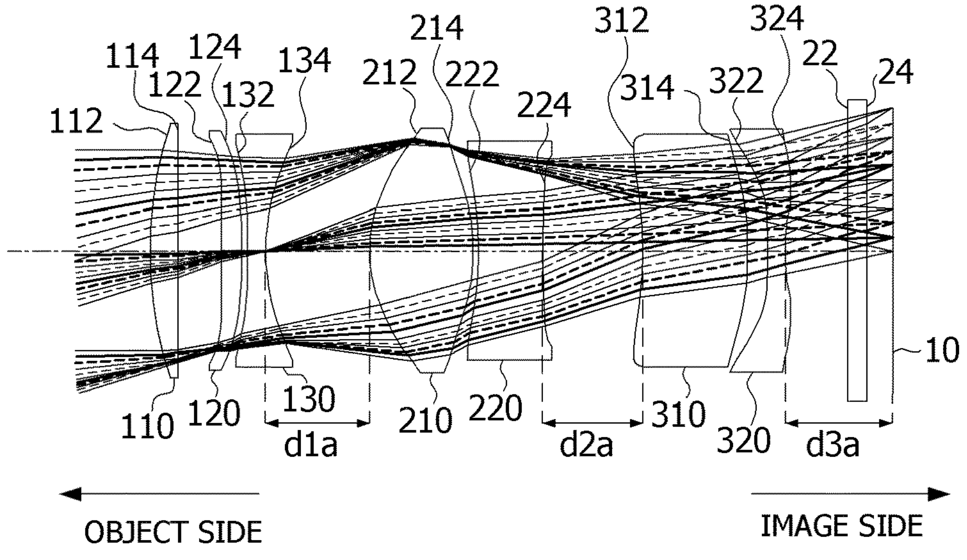
FIG. 3A is a cross-sectional view of a zoom optical system in a wide angle according to a first embodiment of the present invention.
Figure 3B:
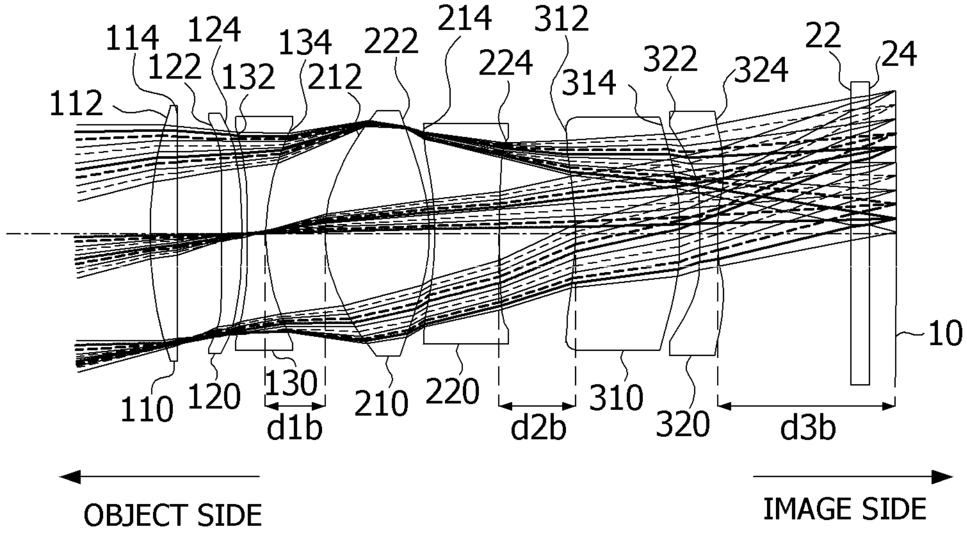
FIG. 3B is a cross-sectional view of the zoom optical system in a middle mode according to the first embodiment of the present invention.
Figure 3C:
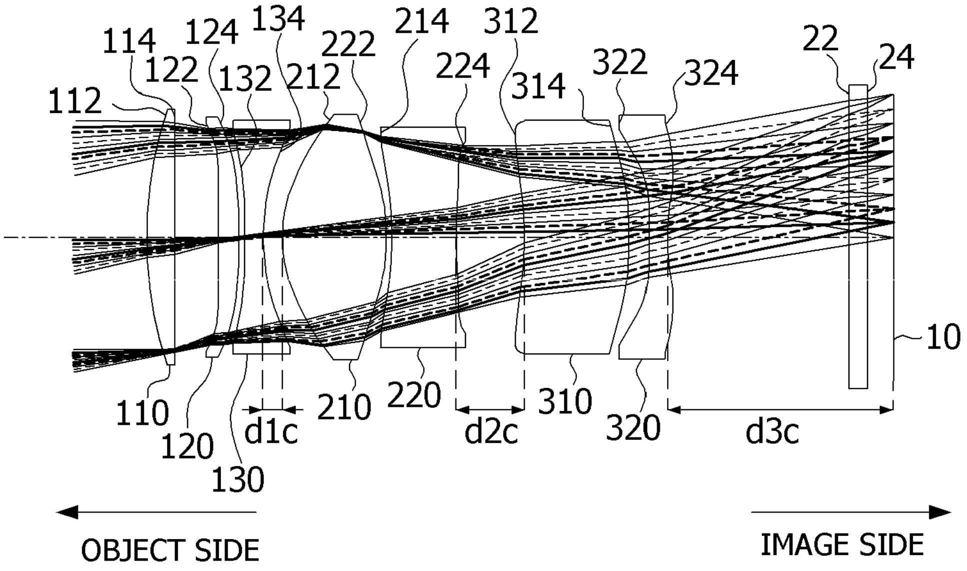
FIG. 3C is a cross-sectional view of the zoom optical system in a telephoto according to the first embodiment of the present invention.

FIG. 3A is a cross-sectional view of a zoom optical system in a wide angle according to a first embodiment of the present invention, FIG. 3B is a cross-sectional view of the zoom optical system in a middle mode according to the first embodiment of the present invention, and FIG. 3C is a cross-sectional view of the zoom optical system in a telephoto according to the first embodiment of the present invention.

Tables 2 and 3 below show optical properties of lenses included in the zoom optical system according to the first embodiment of the present invention, and Tables 4 and 5 show Conic constants and aspheric coefficients of the lenses included in the zoom optical system according to the first embodiment of the present invention.

TABLE 2

| Lens No. | Lens surface No. | Radius of curvature (R, mm) | Thickness (mm) | Material | Refractive index |
|---|---|---|---|---|---|
| First lens | 112 | 13.5503 | 0.634981 | Plastic | 1.5445 |
| | 114 | −19.3476 | 0.959547 | | |
| Second lens | 122 | −12.5383 | 0.428846 | Plastic | 1.6714 |
| | 124 | −7.74853 | 0.1 | | |
| Third lens | 132 | 23.5637 | 0.4 | Plastic | 1.5445 |
| | 134 | 2.54411 | 2.30982(0.4) | | |
| Fourth lens | 212 | 3.30033 | 2.2636 | Plastic | 1.5348 |
| | 214 | −4.21398 | 0.1 | | |
| Fifth lens | 222 | −9.29324 | 1.42982 | Plastic | 1.6714 |
| | 224 | 28.0411 | 2.16647(1.4788) | | |
| Sixth lens | 312 | −8.40273 | 2.3 | Plastic | 1.6714 |
| | 314 | −6.42439 | 0.44382 | | |
| Seventh lens | 322 | 10.8141 | 0.4 | Plastic | 1.5445 |
| | 324 | 3.10215 | 2.36(4.95749) | | |
| Filter | 22 | | | | |
| | 24 | | | | |
| Sensor | 10 | | | | |

TABLE 3

| Lens No. | Lens surface No. | Abbe number | Shape | Semi-aperture |
|---|---|---|---|---|
| First lens | 112 | 55.96 | Convex | 2.5 |
| | 114 | | Concave | 2.461 |
| Second lens | 122 | 19.23 | Concave | 2.3404 |
| | 124 | | Concave | 2.3625 |
| Third lens | 132 | 55.96 | Convex | 2.3073 |
| | 134 | | Convex | 2.2654 |
| Fourth lens | 212 | 55.70 | Convex | 2.4003 |
| | 214 | | Concave | 2.2550 |
| Fifth lens | 222 | 19.23 | Concave | 2.1577 |
| | 224 | | Convex | 1.9639 |
| Sixth lens | 312 | 19.23 | Concave | 2.1028 |
| | 314 | | Concave | 2.2945 |
| Seventh lens | 322 | 55.96 | Convex | 2.2909 |
| | 324 | | Convex | 2.4999 |
| Filter | 22 | 54.47 | | 2.9712 |
| | 24 | | | |
| Sensor | 10 | | | |

TABLE 4

| Lens surface No. | Conic constant (K) | A | B | C | D |
|---|---|---|---|---|---|
| 112 | −21.1506 | 2.13E−03 | 1.05E−03 | −3.63E−04 | 5.33E−05 |
| 114 | 46.13667 | 4.83E−03 | 2.05E−03 | −9.82E−04 | 2.10E−04 |
| 122 | 1.930895 | 1.44E−02 | −4.45E−03 | 2.45E−03 | −1.48E−03 |
| 124 | −60.1207 | 5.01E−03 | −1.30E−02 | 1.51E−02 | −9.29E−03 |
| 132 | 80.67428 | −5.00E−02 | 1.03E−02 | 9.52E−03 | −9.27E−03 |
| 134 | −9.64545 | −5.06E−03 | 4.40E−04 | 4.37E−03 | −3.68E−03 |
| 212 | −0.26093 | −8.90E−04 | −2.21E−04 | 1.81E−04 | −1.24E−04 |
| 214 | −1.73042 | −1.92E−03 | 4.22E−03 | −1.76E−03 | 5.05E−04 |
| 222 | 2.218885 | −6.96E−03 | 4.40E−03 | −1.27E−03 | 3.20E−04 |
| 224 | 69.60929 | −1.69E−03 | 5.76E−04 | 1.48E−03 | −1.36E−03 |
| 312 | 9.568657 | 8.01E−03 | −1.21E−03 | 1.06E−03 | −6.78E−04 |
| 314 | −1.39842 | −3.76E−03 | 5.50E−03 | −3.18E−03 | 1.24E−03 |
| 322 | −2.74335 | −0.11639 | 5.53E−02 | −2.47E−02 | 9.33E−03 |
| 324 | −15.8676 | −5.74E−02 | 2.36E−02 | −7.66E−03 | 1.84E−03 |

TABLE 5

| Lens surface No. | E | F | G | H | J |
|---|---|---|---|---|---|
| 112 | 8.65E−06 | −6.24E−06 | 1.30E−06 | −1.28E−07 | 5.10E−09 |
| 114 | −4.90E−06 | −1.07E−05 | 2.87E−06 | −3.17E−07 | 1.36E−08 |
| 122 | 4.80E−04 | −9.62E−05 | 1.23E−05 | −9.22E−07 | 3.07E−08 |
| 124 | 3.26E−03 | −6.99E−04 | 9.11E−05 | −6.66E−06 | 2.10E−07 |
| 132 | 3.86E−03 | −9.21E−04 | 1.30E−04 | −1.02E−05 | 3.40E−07 |
| 134 | 1.57E−03 | −4.03E−04 | 6.22E−05 | −5.34E−06 | 1.96E−07 |
| 212 | 5.11E−05 | −1.34E−05 | 2.14E−06 | −1.90E−07 | 7.03E−09 |
| 214 | −9.82E−05 | 1.12E−05 | −4.55E−07 | −4.01E−08 | 3.92E−09 |
| 222 | −5.24E−05 | 2.67E−06 | 7.90E−07 | −1.75E−07 | 1.17E−08 |
| 224 | 8.21E−04 | −3.18E−04 | 7.63E−05 | −1.04E−05 | 6.08E−07 |
| 312 | 3.38E−04 | −1.14E−04 | 2.39E−05 | −2.83E−06 | 1.45E−07 |
| 314 | −3.13E−04 | 4.95E−05 | −4.63E−06 | 2.33E−07 | −4.84E−09 |
| 322 | −2.69E−03 | 5.48E−04 | −7.24E−05 | 5.56E−06 | −1.87E−07 |
| 324 | −2.82E−04 | 1.66E−05 | 2.28E−06 | −4.66E−07 | 2.40E−08 |

Referring to FIGS. 3A to 3C and Tables 2 to 5, the zoom optical system includes a first lens group 100, a second lens group 200, and a third lens group 300, which are sequentially arranged from an object side to an image side. The first lens group 100 includes a first lens 110, a second lens 120, and a third lens 130, which are sequentially arranged from the object side to the image side. The second lens group 200 includes a fourth lens 210 and a fifth lens 220 sequentially arranged from the object side to the image side. The third lens group 300 includes a sixth lens 310 and a seventh lens 320 sequentially arranged from the object side to the image side. In Table 2, a thickness [mm] denotes a distance from each lens surface to the next lens surface.

For example, a thickness written to an object side surface 112 of the first lens 110 denotes a distance from the object side surface 112 of the first lens 110 to an image side surface 114 of the first lens 110. Specifically, the thickness written to the object side surface 112 of the first lens 110 denotes a distance between a center of a curvature of the object side surface 112 of the first lens 110 to a center of a curvature of the image side surface 114.

A thickness written to the image side surface 114 of the first lens 110 denotes a distance from the image side surface 114 of the first lens 110 to an object side surface 122 of the second lens 120. Specifically, the thickness written to the image side surface 114 of the first lens 110 denotes a distance between a center of a curvature of the image side surface 114 of the first lens 110 and a center of a curvature of the object side surface 122 of the second lens 120.

A thickness written to an image side surface 134 of the third lens 130 denotes a distance from the image side surface 134 of the third lens 130 to an object side surface 212 of the fourth lens 210. Specifically, the thickness written to the image side surface 134 of the third lens 130 denotes a distance between a center of a curvature of the image side surface 134 of the third lens 130 and a center of a curvature of the object side surface 212 of the fourth lens 210.

In this case, the second lens group 200 moves in a process of zooming from the wide angle to the telephoto, and thus the thickness written to the image side surface 134 of the third lens 130 may be changed. The thickness written to the image side surface 134 of the third lens 130 may have a value between the longest distance and the shortest distance. Referring to Table 2, the thickness written to the image side surface 134 of the third lens 130 may have the longest distance of 2.3098 in the wide angle. The thickness written to the image side surface 134 of the third lens 130 may have a value between the shortest distance and the longest distance in the middle mode. The thickness written to the image side surface 134 of the third lens 130 may have the shortest distance of 0.4 in the telephoto. Thicknesses written to an image side surface 224 of the fifth lens 220 and an image side surface 324 the seventh lens 320 are also equal.

Referring to Table 3, each surface of the first to seventh lenses 110 to 320 may be implemented in a convex or concave shape.

The first lens 110 may be a lens in which the object side surface 112 is convex toward the object side. The first lens

110 may be a lens in which the image side surface 114 is concave toward the object side. The second lens 120 may be a lens in which the object side surface 122 is concave toward the object side. The second lens 120 may be a lens in which an image side surface 124 is concave toward the object side. The third lens 130 may be a lens in which an object side surface 132 is convex toward the object side. The third lens 130 may be a lens in which the image side surface 134 is convex toward the object side.

The fourth lens 210 may be a lens in which the object side surface 212 is convex toward the object side. The fourth lens 210 may be a lens in which an image side surface 214 is concave toward the object side. The fifth lens 220 may be a lens in which an object side surface 222 is concave toward the object side. The fifth lens 220 may be a lens in which the image side surface 224 is convex toward the object side.

Meanwhile, when a distance between the first lens group 100 and the second lens group 200 is the smallest distance (i.e., in the telephoto), the center of the curvature of the object side surface 212 of the fourth lens 210 may be located closer to the image side than both ends of the image side surface 134 of the third lens 130.

The sixth lens 310 may be a lens in which an object side surface 312 is concave toward the object side. The sixth lens 310 may be a lens in which an image side surface 314 is concave toward the object side. The seventh lens 320 may be a lens in which an object side surface 322 is convex toward the object side. The seventh lens 320 may be a lens in which an image side surface 324 is convex toward the object side.

Referring to FIG. 3A, when the distance between the first lens group 100 and the second lens group 200 is d1*a*, the distance between the second lens group 200 and the third lens group 300 is d2*a*, and a distance between the third lens group 300 and the image sensor 10 is d3*a*, the zoom optical system may have the wide angle (e.g., a magnification of 3 times). That is, when the distance between the center of the curvature of the image side surface 134 of the third lens 130 and the center of the curvature of the object side surface 212 of the fourth lens 210 is d1*a*, the distance between the center of the curvature of the image side surface 224 of the fifth lens 220 and the center of the curvature of the object side surface 312 of the sixth lens 310 is d2*a*, and the distance between the center of the curvature of the image side surface 324 of the seventh lens 320 and the image sensor 10 is d3*a*, the zoom optical system may have the wide angle.

In FIG. 3B, when the distance between the first lens group 100 and the second lens group 200 is d1*b*, the distance between the second lens group 200 and the third lens group 300 is d2*b*, and the distance between the third lens group 300 and the image sensor 10 is d3*b*, the zoom optical system may have the middle mode. That is, when the distance between the center of the curvature of the image side surface 134 of the third lens 130 and the center of the curvature of the object side surface 212 of the fourth lens 210 is d1*b*, the distance between the center of the curvature of the image side surface 224 of the fifth lens 220 and the center of the curvature of the object side surface 312 of the sixth lens 310 is d2*b*, and the distance between the center of the curvature of the image side surface 324 of the seventh lens 320 and the image sensor 10 is d3*b*, the zoom optical system may have the middle mode.

In FIG. 3C, when the distance between the first lens group 100 and the second lens group 200 is d1*c*, the distance between the second lens group 200 and the third lens group 300 is d2*c*, and the distance between the third lens group 300 and the image sensor 10 d3*c*, the zoom optical system may have the telephoto (e.g., a magnification of 5 times). That is, when the distance between the center of the curvature of the image side surface 134 of the third lens 130 and the center of the curvature of the object side surface 212 of the fourth lens 210 is d1*c*, the distance between the center of the curvature of the image side surface 224 of the fifth lens 220 and the center of the curvature of the object side surface 312 of the sixth lens 310 is d2*c*, and when the distance between the center of the curvature of the image side surface 324 of the seventh lens 320 and the image sensor 10 is d3*c*, the zoom optical system may have the telephoto.

The distance between adjacent lens groups may be changed in a process of changing the magnification from the wide angle to the telephoto.

The distance between the first lens group 100 and the second lens group 200 may be changed from d1*a* to d1*c* via d1*b*. Referring to Table 2, the distance d1*a* between the first lens group 100 and the second lens group 200 in the wide angle is 2.3098 mm. The distance d1*c* between the first lens group 100 and the second lens group 200 in the telephoto is 0.4 mm. As described above, the distance between the first lens group 100 and the second lens group 200 may be changed from 2.3098 mm to 0.4 mm in the process of changing the magnification from the wide angle to the telephoto via the middle mode. That is, the distance between the first lens group 100 and the second lens group 200 may be gradually reduced in the process of changing the magnification from the wide angle to the telephoto (d1*a*>d1*b*>d1*c*). An amount by which the distance between the first lens group 100 and the second lens group 200 increases may be gradually reduced in the process of changing the magnification from the wide angle to the telephoto.

The distance between the second lens group 200 and the third lens group 300 may be changed from d2*a* to d2*c* via d2*b*. Referring to Table 2, the distance d2*a* between the second lens group 200 and the third lens group 300 in the wide angle is 2.1665 mm. The distance d1*c* between the second lens group 200 and the third lens group 300 in the telephoto is 1.4788 mm. As described above, the distance between the second lens group 200 and the third lens group 300 may be changed from 2.1665 mm to 1.4788 mm in the process of changing the magnification from the wide angle to the telephoto via the middle mode. That is, the distance between the second lens group 200 and the third lens group 300 may be reduced in the process of changing the magnification from the wide angle to the telephoto (d2*a*>d2*b*>d2*c*). In this case, an amount by which the distance between the second lens group 200 and the third lens group 300 increases may be gradually reduced in the process of changing the magnification from the wide angle to the telephoto.

The distance between the third lens group 300 and the image sensor 10 may be changed from d3*a* to d3*c* via d3*b*. Referring to Table 2, the distance d3*a* between the third lens group 300 and the image sensor 10 in the wide angle is 2.36 mm. The distance d3*c* between the third lens group 300 and the image sensor 10 in the telephoto is 4.95749 mm. As described above, the distance between the third lens group 300 and the image sensor 10 may be changed from 2.36 mm to 4.95749 mm in the process of changing the magnification from the wide angle to the telephoto via the middle mode. The distance between the third lens group 300 and the image sensor 10 may gradually increase in the process of changing the magnification from the wide angle to the telephoto (d3*a*<d3*b*<d3*c*). However, an amount by which the distance between the third lens group 300 and the image sensor 10 increases may be gradually reduced in the process of changing the magnification from the wide angle to the telephoto.

The second lens group 200 and the third lens group 300 may have different moving speeds.

As the second lens group 200 and the third lens group 300 move, the magnification of the zoom optical system may be continuously adjusted from a magnification of 3 times to a magnification of 5 times.

Next, simulation results of longitudinal spherical aberrations, astigmatic field curves, and a distortion of the zoom optical system according to the first embodiment of the present invention will be described with reference to FIGS. 4A to 4C. The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface.

Figure 4A:
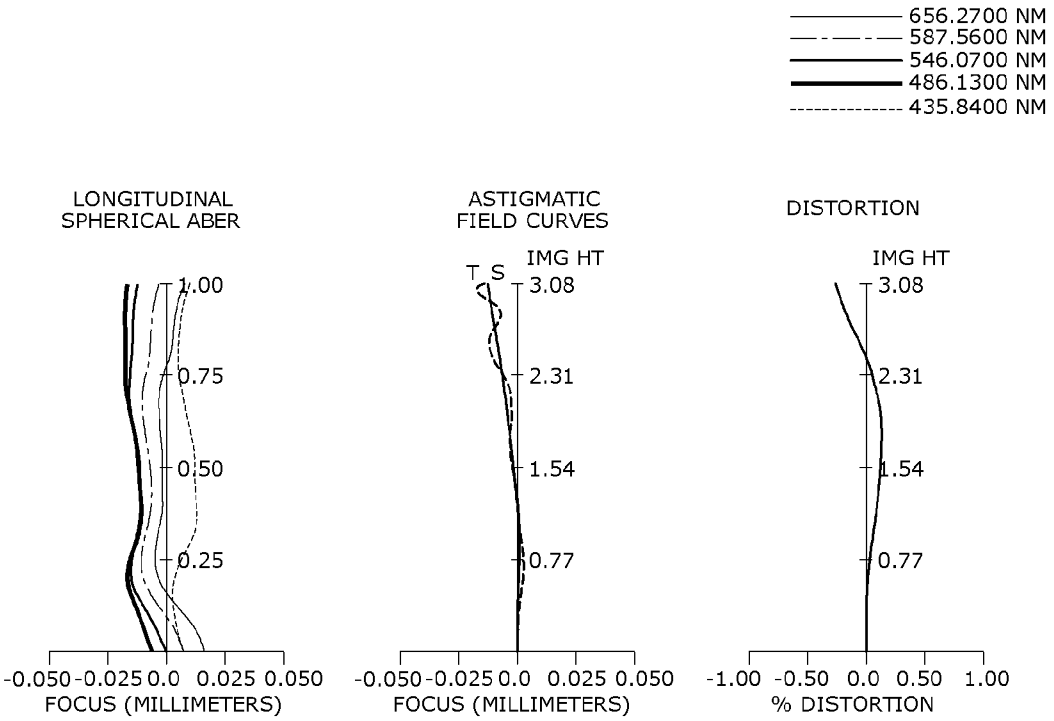
FIG. 4A is a graph measuring longitudinal spherical aberrations, astigmatic field curves, and a distortion in the optical system in the wide angle for light of wavelengths of 435 nm, 486 nm, 546 nm, 587 nm, and 656 nm according to the first embodiment of the present invention.

FIG. 4A is a graph measuring the longitudinal spherical aberrations, the astigmatic field curves, and the distortion in the optical system in the wide angle for light of wavelengths of 435 nm, 486 nm, 546 nm, 587 nm, and 656 nm according to the first embodiment of the present invention.

Figure 4B:
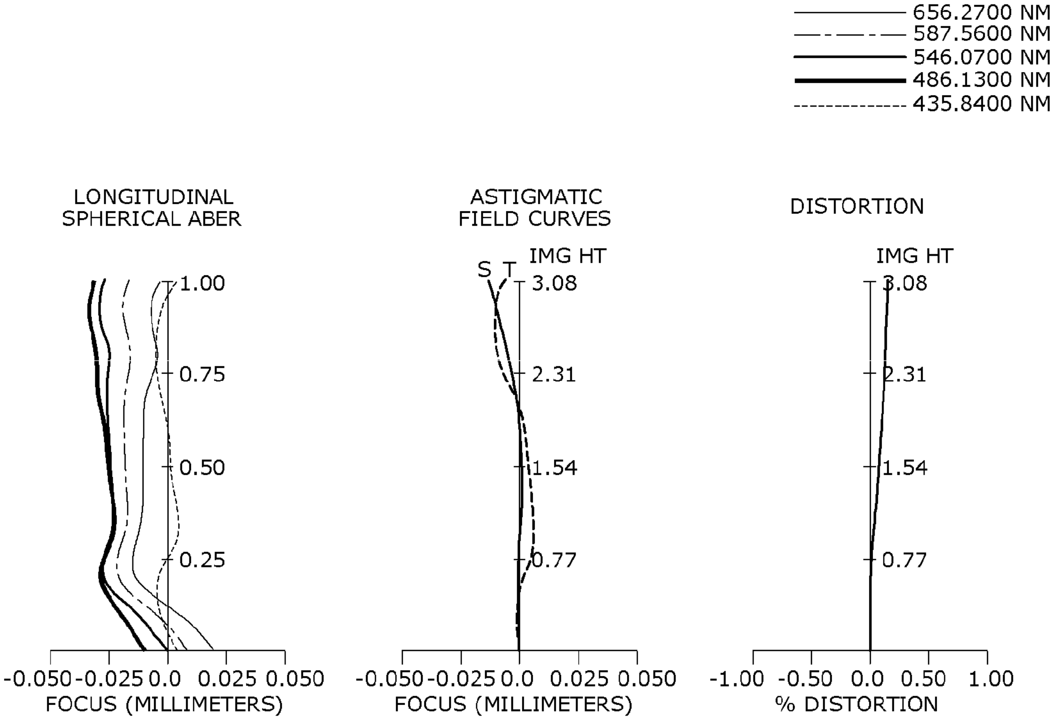
FIG. 4B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the first embodiment of the present invention.

FIG. 4B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the first embodiment of the present invention.

Figure 4C:
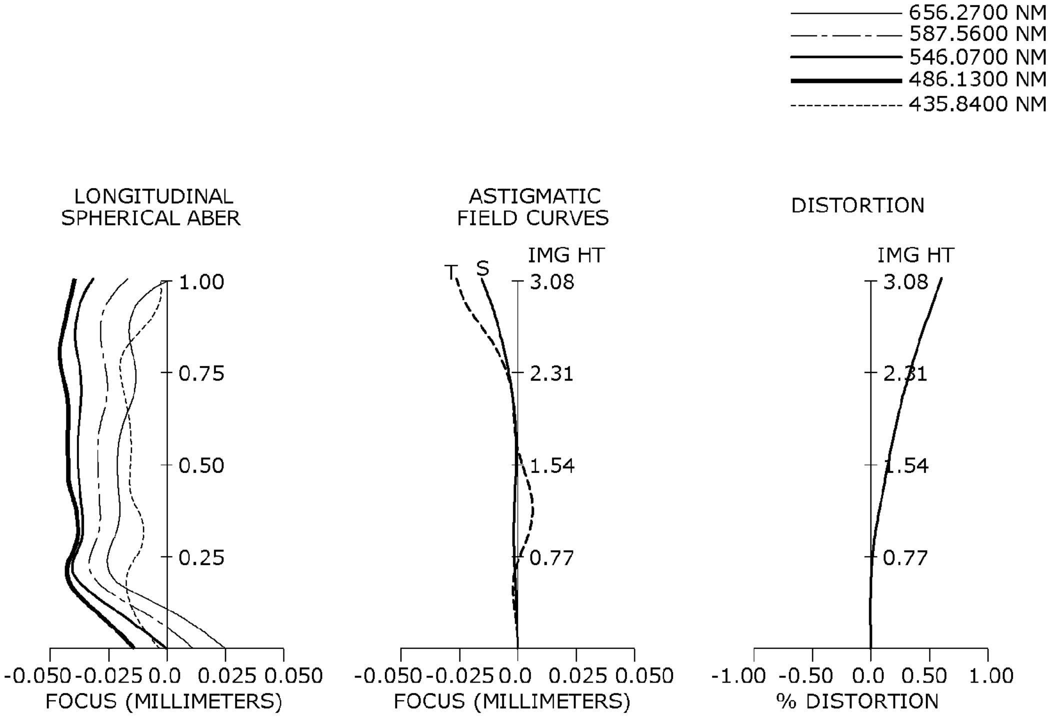
FIG. 4C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the first embodiment of the present invention.

FIG. 4C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the first embodiment of the present invention.

Referring to FIGS. 4A to 4C, it can be seen that the longitudinal spherical aberration is within a range of −0.05 mm to 0.025 mm from a center to an edge of the image sensor regardless of the wavelength. Specifically, it can be seen that the longitudinal spherical aberration is within a range of approximately −0.02 mm to 0.02 mm in the wide mode, and is within a range of −0.025 mm to 0.025 mm in the middle mode. It can be seen that the longitudinal spherical aberration is within a range of −0.05 mm to 0.025 mm in the telephoto.

Referring to FIGS. 4A to 4C, it can be seen that the astigmatic field curve is within a range of −0.025 mm to 0.01 mm from the center to the edge of the image sensor regardless of the wavelength. Specifically, it can be seen that the astigmatic field curve is within a range of approximately −0.005 mm to 0.01 mm in the wide mode, and is within a range of −0.02 mm to 0.01 mm in the middle mode. It can be seen that the astigmatic field curve is within a range of approximately −0.025 mm to 0.01 mm in the telephoto.

Referring to FIGS. 4A to 4C, it can be seen that the distortion is within a range of −0.25% to 1% from the center to the edge of the image sensor regardless of the wavelength. Specifically, it can be seen that the distortion is within a range of approximately −0.25% to 0.2% in the wide mode, and is within a range of 0% to 0.2% in the middle mode. It can be seen that the distortion is within a range of approximately 0% to 1% in the telephoto.

Next, modulation transfer function (MTF) simulation results of the zoom optical system according to the embodiment of the present invention will be described with reference to FIGS. 5A and 5B. The MTF refers to one of methods for measuring the performance of an optical system.

Figure 5A:
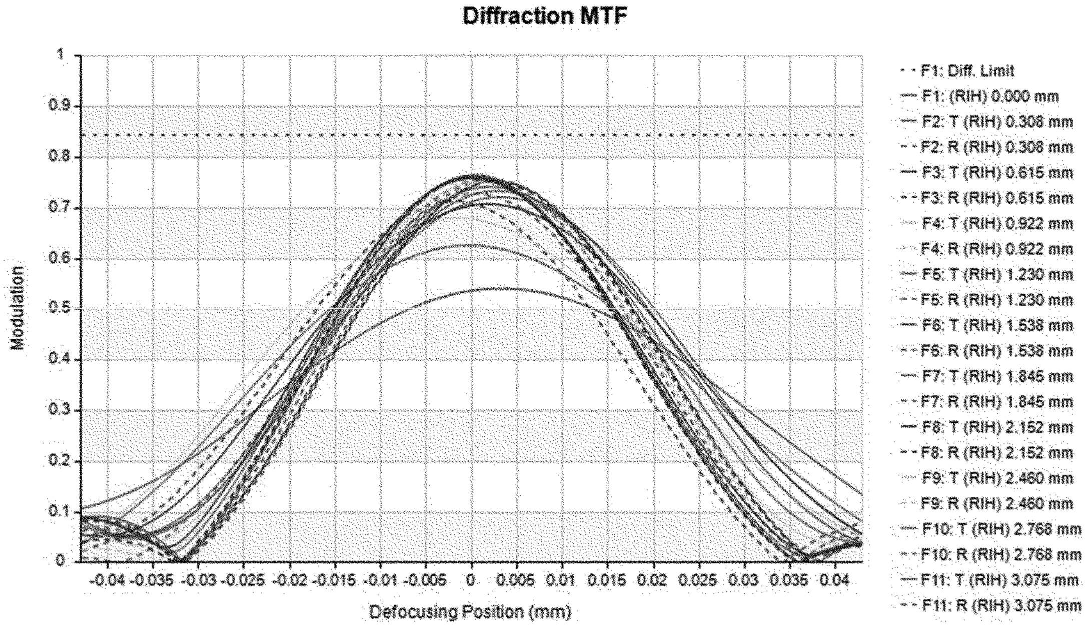
FIG. 5A is a diffraction modulation transfer function (MTF) graph of the optical system in the wide angle according to the embodiment.

FIG. 5A is a diffraction MTF graph of the optical system in the wide angle according to the embodiment. FIG. 5B is a diffraction MTF graph of the optical system in the telephoto according to the embodiment.

Figure 5B:
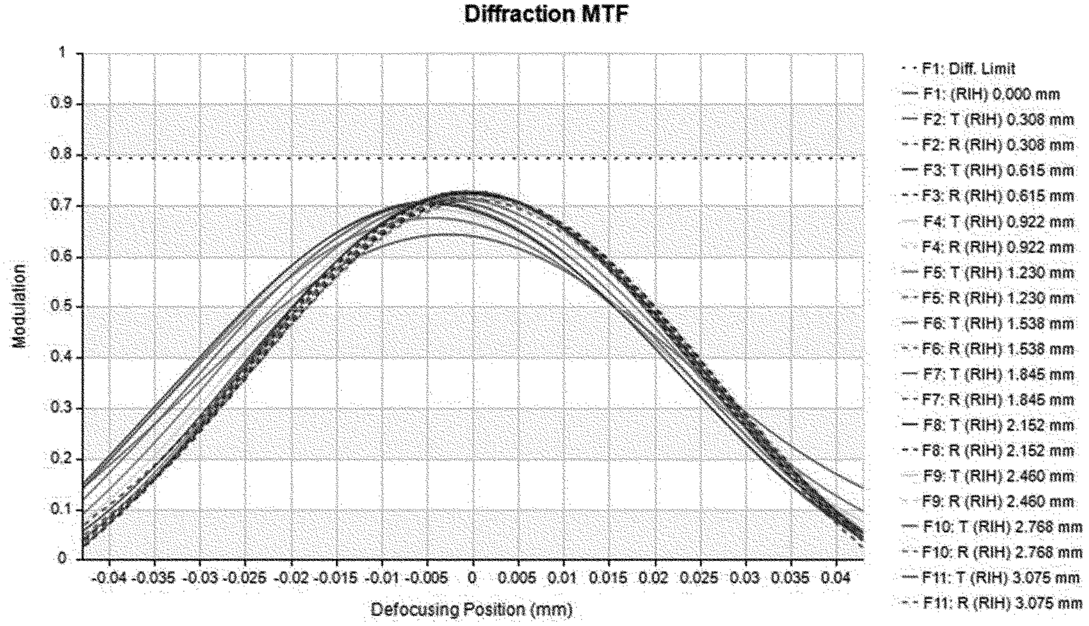
FIG. 5B is a diffraction MTF graph of the optical system in the telephoto according to the embodiment.

Referring to FIGS. 5A and 5B, it can be seen that the zoom optical system according to the embodiment of the present invention has a value close to a diffraction limit, which is a limit value, near a defocusing position (0 mm) in each of the wide angle and the telephoto.

Figure 6A:
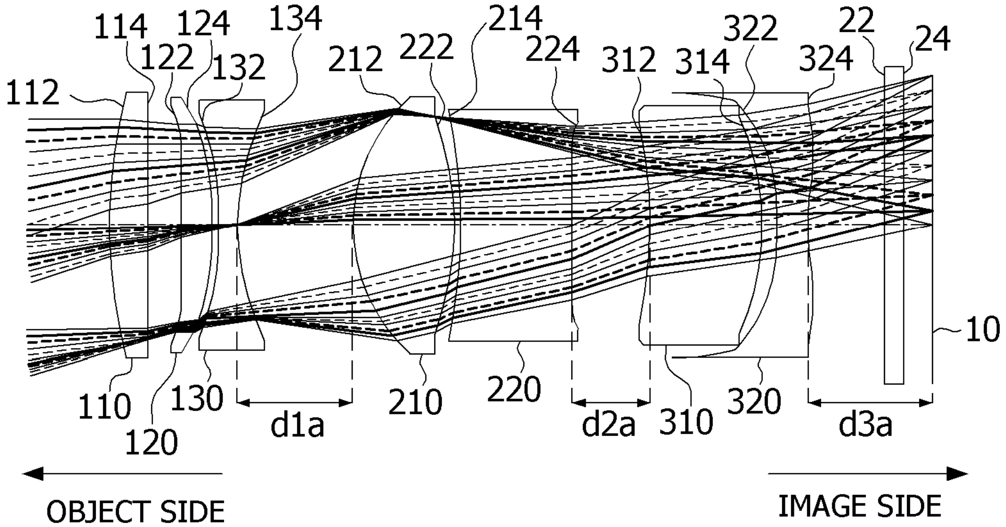
FIG. 6A is a cross-sectional view of a zoom optical system in a wide angle according to a second embodiment of the present invention.
Figure 6B:
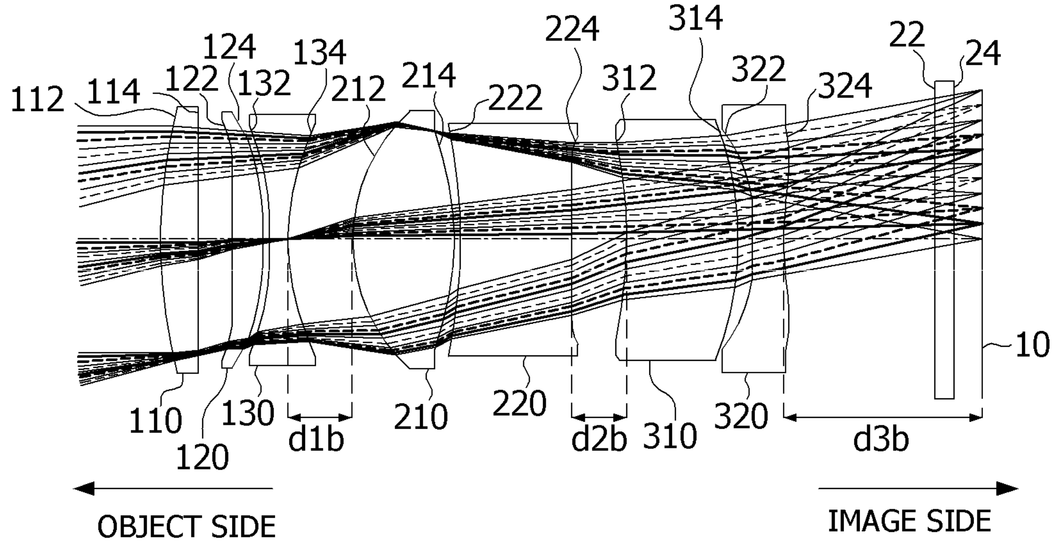
FIG. 6B is a cross-sectional view of the zoom optical system in a middle mode according to the second embodiment of the present invention.
Figure 6C:
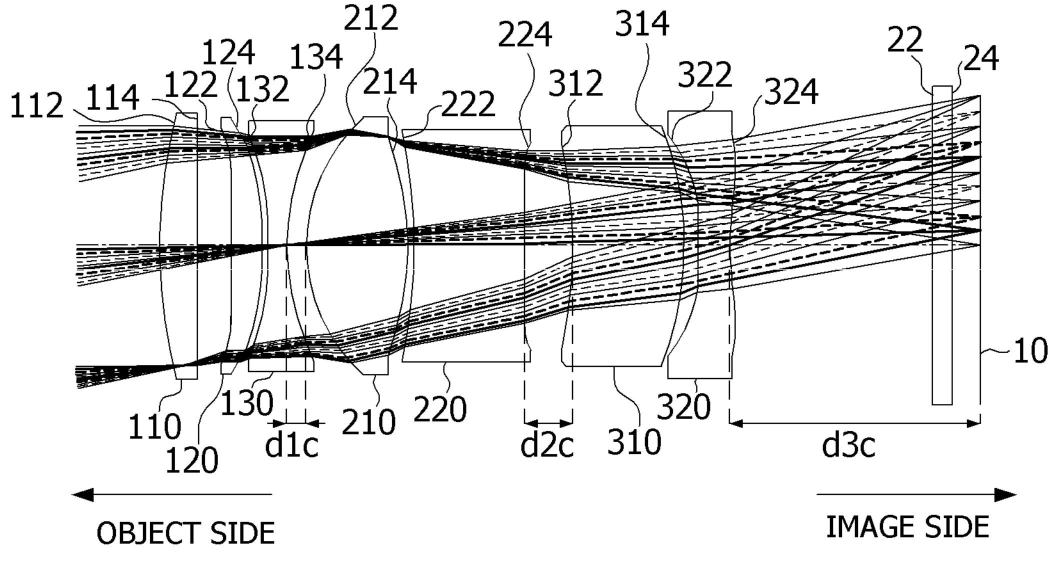
FIG. 6C is a cross-sectional view of the zoom optical system in a telephoto according to the second embodiment of the present invention.

FIG. 6A is a cross-sectional view of a zoom optical system in a wide angle according to a second embodiment of the present invention, FIG. 6B is a cross-sectional view of the zoom optical system in a middle mode according to the second embodiment of the present invention, and FIG. 6C is a cross-sectional view of the zoom optical system in a telephoto according to the second embodiment of the present invention.

Tables 6 and 7 below show optical properties of lenses included in the zoom optical system according to the second embodiment of the present invention, and Tables 8 and 9 show Conic constants and aspheric coefficients of the lenses included in the zoom optical system according to the second embodiment of the present invention.

TABLE 6

| Lens No. | Lens surface No. | Radius of curvature (R, mm) | Thickness (mm) | Material | Refractive index |
|---|---|---|---|---|---|
| First lens | 112 | 15.8741 | 0.800229 | Plastic | 1.6714 |
| | 114 | −24.5173 | 0.717263 | | |
| Second lens | 122 | −20.5051 | 0.616737 | Plastic | 1.6714 |
| | 124 | −7.65016 | 0.1 | | |
| Third lens | 132 | 171.442 | 0.404296 | Plastic | 1.614 |
| | 134 | 2.82597 | 2.39383(0.4026) | | |
| Fourth lens | 212 | 3.42137 | 2.14415 | Plastic | 1.5348 |
| | 214 | −4.66978 | 0.1 | | |
| Fifth lens | 222 | −10.0132 | 2.30144 | Plastic | 1.6714 |
| | 224 | 317.456 | 1.6146(1.0112) | | |
| Sixth lens | 312 | −7.02183 | 2.31937 | Plastic | 1.6714 |
| | 314 | −5.38505 | 0.276872 | | |
| Seventh lens | 322 | 36.8878 | 0.638746 | Plastic | 1.5445 |
| | 324 | 3.64979 | 1.59972(4.19435) | | |
| Filter | 22 | | | | 1.523 |
| | 24 | | | | |
| Sensor | 10 | | | | |

TABLE 7

| Lens No. | Lens surface No. | Abbe number | Shape | Semmi-aperture |
|---|---|---|---|---|
| First lens | 112 | 19.23 | Convex | 2.5 |
| | 114 | | Concave | 2.4292 |
| Second lens | 122 | 19.23 | Concave | 2.3506 |
| | 124 | | Concave | 2.3708 |
| Third lens | 132 | 25.9 | Convex | 2.2901 |
| | 134 | | Convex | 2.2242 |
| Fourth lens | 212 | 55.70 | Convex | 2.3994 |
| | 214 | | Concave | 2.23 |
| Fifth lens | 222 | 19.23 | Concave | 2.1639 |
| | 224 | | Convex | 2.0053 |
| Sixth lens | 312 | 19.23 | Concave | 2.1138 |
| | 314 | | Concave | 2.3137 |
| Seventh lens | 322 | 55.96 | Convex | 2.3075 |
| | 324 | | Convex | 2.5525 |
| Filter | 22 | 54.47 | | 2.9263 |
| | 24 | | | 2.9744 |
| Sensor | 10 | | | |

TABLE 8

| Lens surface No. | Conic constant (K) | A | B | C | D |
|---|---|---|---|---|---|
| 112 | −36.2764 | 2.66E−03 | 1.02E−03 | −8.09E−04 | 3.16E−04 |
| 114 | 32.90901 | 6.41E−03 | 1.65E−03 | −1.76E−03 | 6.61E−04 |
| 122 | 25.08857 | 1.41E−02 | −3.50E−03 | 6.42E−04 | −6.69E−04 |
| 124 | −27.0428 | −1.01E−02 | 4.88E−03 | −1.01E−03 | −8.57E−04 |
| 132 | −89.0532 | −7.59E−02 | 4.43E−02 | −1.78E−02 | 4.87E−03 |
| 134 | −10.5682 | −1.73E−02 | 1.49E−02 | −5.75E−03 | 1.07E−03 |
| 212 | −0.19281 | −8.06E−04 | −9.90E−04 | 1.14E−03 | −7.36E−04 |
| 214 | −1.78914 | −3.18E−03 | 6.37E−03 | −4.06E−03 | 1.82E−03 |
| 222 | 2.968688 | −5.88E−03 | 5.96E−03 | −3.90E−03 | 1.94E−03 |
| 224 | 97.90897 | 2.04E−03 | −4.12E−03 | 7.71E−03 | −7.03E−03 |
| 312 | 3.236055 | 1.05E−02 | −5.66E−03 | 5.49E−03 | −3.54E−03 |
| 314 | −8.12726 | −1.06E−02 | 9.17E−03 | −9.51E−03 | 6.90E−03 |
| 322 | −2.44991 | −7.65E−02 | 3.49E−02 | −2.40E−02 | 1.51E−02 |
| 324 | −1.03981 | −6.96E−02 | 2.65E−02 | −1.01E−02 | 3.46E−03 |

TABLE 9

| Lens surface No. | E | F | G | H | J |
|---|---|---|---|---|---|
| 112 | −8.09E−05 | 1.39E−05 | −1.55E−06 | 1.01E−07 | −2.89E−09 |
| 114 | −1.42E−04 | 1.60E−05 | −4.10E−07 | −9.26E−08 | 7.29E−09 |
| 122 | 3.77E−04 | −1.21E−04 | 2.23E−05 | −2.20E−06 | 8.91E−08 |
| 124 | 5.60E−04 | −1.51E−04 | 2.23E−05 | −1.77E−06 | 6.00E−08 |
| 132 | −9.06E−04 | 1.27E−04 | −1.49E−05 | 1.29E−06 | −5.36E−08 |
| 134 | 3.74E−05 | −6.53E−05 | 1.40E−05 | −1.33E−06 | 4.83E−08 |
| 212 | 2.91E−04 | −7.13E−05 | 1.06E−05 | −8.82E−07 | 3.15E−08 |
| 214 | −5.32E−04 | 9.80E−05 | −1.05E−05 | 5.57E−07 | −8.13E−09 |
| 222 | −6.40E−04 | 1.35E−04 | −1.74E−05 | 1.22E−06 | −3.42E−08 |
| 224 | 3.96E−03 | −1.39E−03 | 2.97E−04 | −3.53E−05 | 1.80E−06 |
| 312 | 1.49E−03 | −4.01E−04 | 6.64E−05 | −6.18E−06 | 2.48E−07 |
| 314 | −3.10E−03 | 8.51E−04 | −1.39E−04 | 1.23E−05 | −4.59E−07 |
| 322 | −6.48E−03 | 1.74E−03 | −2.78E−04 | 2.43E−05 | −8.88E−07 |
| 324 | −9.14E−04 | 1.66E−04 | −1.90E−05 | 1.20E−06 | −3.12E−08 |

Referring to FIGS. 6A to 6C and Tables 6 to 9, the zoom optical system includes a first lens group 100, a second lens group 200, and a third lens group 300, which are sequentially arranged from an object side to an image side. The first lens group 100 includes a first lens 110, a second lens 120, and a third lens 130, which are sequentially arranged from the object side to the image side. The second lens group 200 includes a fourth lens 210 and a fifth lens 220 sequentially arranged from the object side to the image side. The third lens group 300 includes a sixth lens 310 and a seventh lens 320 sequentially arranged from the object side to the image side. In Table 6, a thickness [mm] denotes a distance from each lens surface to the next lens surface.

For example, a thickness written to an object side surface 112 of the first lens 110 denotes a distance from the object side surface 112 of the first lens 110 to an image side surface 114 of the first lens 110. Specifically, the thickness written to the object side surface 112 of the first lens 110 denotes a distance between a center of a curvature of the object side surface 112 of the first lens 110 to a center of a curvature of the image side surface 114.

A thickness written to the image side surface 114 of the first lens 110 denotes a distance from the image side surface 114 of the first lens 110 to an object side surface 122 of the second lens 120. Specifically, the thickness written to the image side surface 114 of the first lens 110 denotes a distance between a center of a curvature of the image side surface 114 of the first lens 110 and a center of a curvature of the object side surface 122 of the second lens 120.

A thickness written to an image side surface 134 of the third lens 130 denotes a distance from the image side surface 134 of the third lens 130 to an object side surface 212 of the fourth lens 210. Specifically, the thickness written to the image side surface 134 of the third lens 130 denotes a distance between a center of a curvature of the image side surface 134 of the third lens 130 and a center of a curvature of the object side surface 212 of the fourth lens 210.

In this case, the second lens group 200 moves in a process of zooming from the wide angle to the telephoto, and thus the thickness written to the image side surface 134 of the third lens 130 may be changed. The thickness written to the image side surface 134 of the third lens 130 may have a value between the longest distance and the shortest distance. Referring to Table 6, the thickness written to the image side surface 134 of the third lens 130 may have the longest distance of 2.39383 in the wide angle. The thickness written to the image side surface 134 of the third lens 130 may have a value between the shortest distance and the longest distance in the middle mode. The thickness written to the image side surface 134 of the third lens 130 may have the shortest distance of 0.4026 in the telephoto. Thicknesses written to image side surfaces of the fifth lens 220 and the seventh lens 320 are also equal.

Referring to Table 7, each surface of the first to seventh lenses 110 to 320 may be implemented in a convex or concave shape.

The first lens 110 may be a lens in which the object side surface 112 is convex toward the object side. The first lens

110 may be a lens in which the image side surface 114 is concave toward the object side. The second lens 120 may be a lens in which the object side surface 122 is concave toward the object side. The second lens 120 may be a lens in which an image side surface 124 is concave toward the object side. The third lens 130 may be a lens in which an object side surface 132 is convex toward the object side. The third lens 130 may be a lens in which the image side surface 134 is convex toward the object side.

The fourth lens 210 may be a lens in which the object side surface 212 is convex toward the object side. The fourth lens 210 may be a lens in which an image side surface 214 is concave toward the object side. The fifth lens 220 may be a lens in which an object side surface 222 is concave toward the object side. The fifth lens 220 may be a lens in which the image side surface 224 is convex toward the object side.

Meanwhile, when a distance between the first lens group 100 and the second lens group 200 is the smallest distance (i.e., in the telephoto), the center of the curvature of the object side surface 212 of the fourth lens 210 may be located closer to the image side than both ends of the image side surface 134 of the third lens 130.

The sixth lens 310 may be a lens in which an object side surface 312 is concave toward the object side. The sixth lens 310 may be a lens in which an image side surface 314 is concave toward the object side. The seventh lens 320 may be a lens in which an object side surface 322 is convex toward the object side. The seventh lens 320 may be a lens in which an image side surface 324 is convex toward the object side.

Referring to FIG. 6A, when the distance between the first lens group 100 and the second lens group 200 is d1*a*, a distance between the second lens group 200 and the third lens group 300 is d2*a*, and a distance between the third lens group 300 and the image sensor 10 is d3*a*, the zoom optical system may have the wide angle (e.g., a magnification of 3 times). That is, when the distance between the center of the curvature of the image side surface 134 of the third lens 130 and the center of the curvature of the object side surface 212 of the fourth lens 210 is d1*a*, the distance between the center of the curvature of the image side surface 224 of the fifth lens 220 and the center of the curvature of the object side surface 312 of the sixth lens 310 is d2*a*, and the distance between the center of the curvature of the image side surface 324 of the seventh lens 320 and the image sensor 10 is d3*a*, the zoom optical system may have the wide angle.

In FIG. 6B, when the distance between the first lens group 100 and the second lens group 200 is d1*b*, the distance between the second lens group 200 and the third lens group 300 is d2*b*, and the distance between the third lens group 300 and the image sensor 10 is d3*b*, the zoom optical system may have the middle mode. That is, when the distance between the center of the curvature of the image side surface 134 of the third lens 130 and the center of the curvature of the object side surface 212 of the fourth lens 210 is d1*b*, the distance between the center of the curvature of the image side surface 224 of the fifth lens 220 and the center of the curvature of the object side surface 312 of the sixth lens 310 is d2*b*, and the distance between the center of the curvature of the image side surface 324 of the seventh lens 320 and the image sensor 10 is d3*b*, the zoom optical system may have the middle mode.

In FIG. 6C, when the distance between the first lens group 100 and the second lens group 200 is d1*c*, the distance between the second lens group 200 and the third lens group 300 is d2*c*, and the distance between the third lens group 300 and the image sensor 10 d3*c*, the zoom optical system may have the telephoto (e.g., a magnification of 5 times). That is, when the distance between the center of the curvature of the image side surface 134 of the third lens 130 and the center of the curvature of the object side surface 212 of the fourth lens 210 is d1*c*, the distance between the center of the curvature of the image side surface 224 of the fifth lens 220 and the center of the curvature of the object side surface 312 of the sixth lens 310 is d2*c*, and when the distance between the center of the curvature of the image side surface 324 of the seventh lens 320 and the image sensor 10 is d3*c*, the zoom optical system may have the telephoto.

The distance between adjacent lens groups may be changed in a process of changing the magnification from the wide angle to the telephoto.

The distance between the first lens group 100 and the second lens group 200 may be changed from d1*a* to d1*c* via d1*b*. Referring to Table 6, the distance d1*a* between the first lens group 100 and the second lens group 200 in the wide angle is 2.39383 mm. The distance d1*c* between the first lens group 100 and the second lens group 200 in the telephoto is 0.4026 mm. As described above, the distance between the first lens group 100 and the second lens group 200 may be changed from 2.39383 mm to 0.4026 mm in the process of changing the magnification from the wide angle to the telephoto via the middle mode. That is, the distance between the first lens group 100 and the second lens group 200 may be gradually reduced in the process of changing the magnification from the wide angle to the telephoto (d1*a*>d1*b*>d1*c*). An amount by which the distance between the first lens group 100 and the second lens group 200 increases may be gradually reduced in the process of changing the magnification from the wide angle to the telephoto.

The distance between the second lens group 200 and the third lens group 300 may be changed from d2*a* to d2*c* via d2*b*. Referring to Table 6, the distance d2*a* between the second lens group 200 and the third lens group 300 in the wide angle is 1.6146 mm. The distance d1*c* between the second lens group 200 and the third lens group 300 in the telephoto is 1.0112 mm. As described above, the distance between the second lens group 200 and the third lens group 300 may be changed from 1.6146 mm to 1.0112 mm in the process of changing the magnification from the wide angle to the telephoto via the middle mode. That is, the distance between the second lens group 200 and the third lens group 300 may be reduced in the process of changing the magnification from the wide angle to the telephoto (d2*a*>d2*b*>d2*c*). In this case, an amount by which the distance between the second lens group 200 and the third lens group 300 increases may be gradually reduced in the process of changing the magnification from the wide angle to the telephoto.

The distance between the third lens group 300 and the image sensor 10 may be changed from d3*a* to d3*c* via d3*b*. Referring to Table 6, the distance d3*a* between the third lens group 300 and the image sensor 10 in the wide angle is 1.59972 mm. The distance d3*c* between the third lens group 300 and the image sensor 10 in the telephoto is 4.19435 mm. As described above, the distance between the third lens group 300 and the image sensor 10 may be changed from 1.59972 mm to 4.19435 mm in the process of changing the magnification from the wide angle to the telephoto via the middle mode. The distance between the third lens group 300 and the image sensor 10 may gradually increase in the process of changing the magnification from the wide angle to the telephoto (d3*a*<d3*b*<d3*c*). However, an amount by which the distance between the third lens group 300 and the image sensor 10 increases may be gradually reduced in the process of changing the magnification from the wide angle to the telephoto.

The second lens group 200 and the third lens group 300 may have different moving speeds.

As the second lens group 200 and the third lens group 300 move, the magnification of the zoom optical system may be continuously adjusted from a magnification of 3 times to a magnification of 5 times.

Next, simulation results of longitudinal spherical aberrations, astigmatic field curves, and a distortion of the zoom optical system according to the second embodiment of the present invention will be described with reference to FIGS. 7A to 7C. The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface.

Figure 7A:
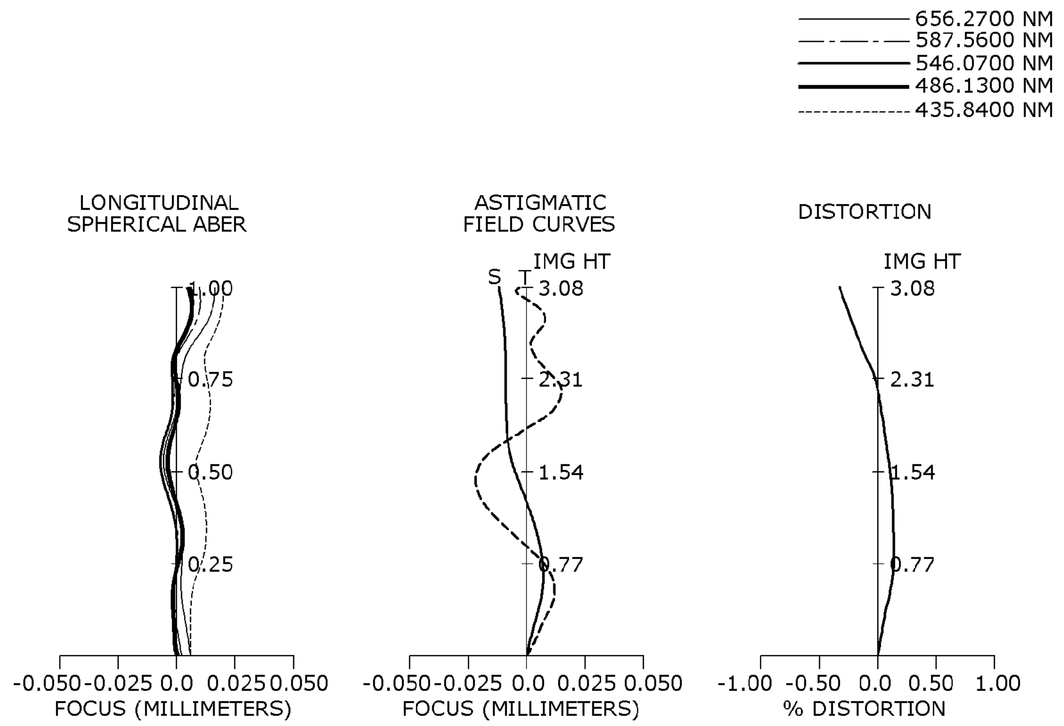
FIG. 7A is a graph measuring longitudinal spherical aberrations, astigmatic field curves, and a distortion in the optical system in the wide angle for light of wavelengths of 435 nm, 486 nm, 546 nm, 587 nm, and 656 nm according to the second embodiment of the present invention.

FIG. 7A is a graph measuring the longitudinal spherical aberrations, the astigmatic field curves, and the distortion in the optical system in the wide angle for light of wavelengths of 435 nm, 486 nm, 546 nm, 587 nm, and 656 nm according to the second embodiment of the present invention.

Figure 7B:
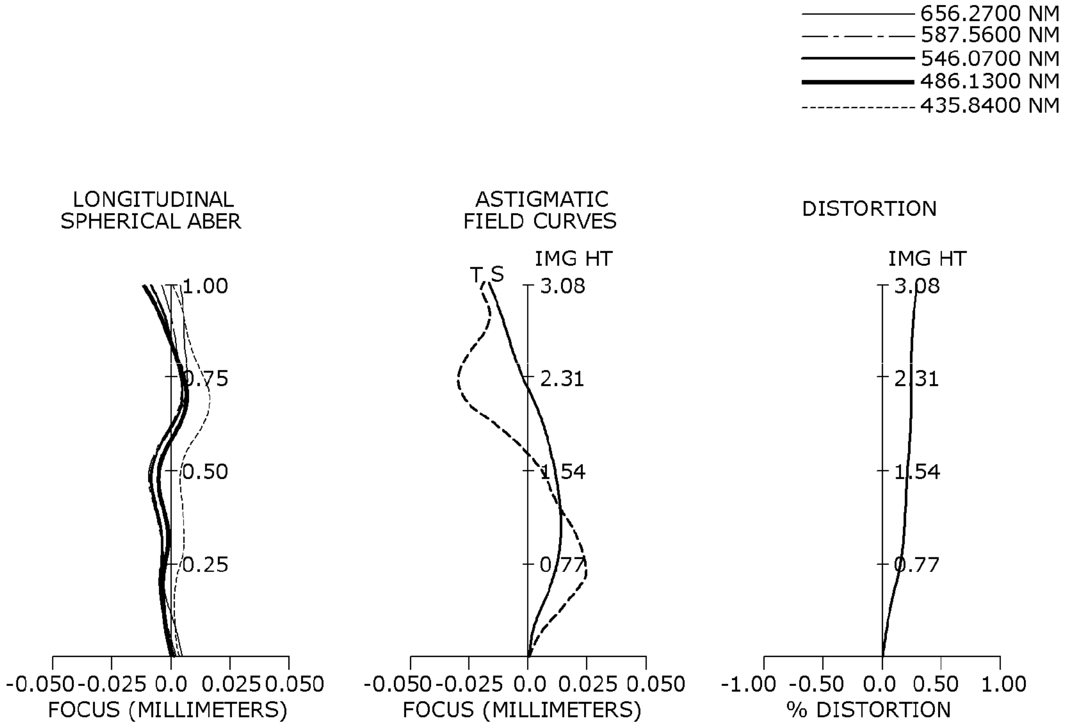
FIG. 7B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the second embodiment of the present invention.

FIG. 7B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the second embodiment of the present invention.

Figure 7C:
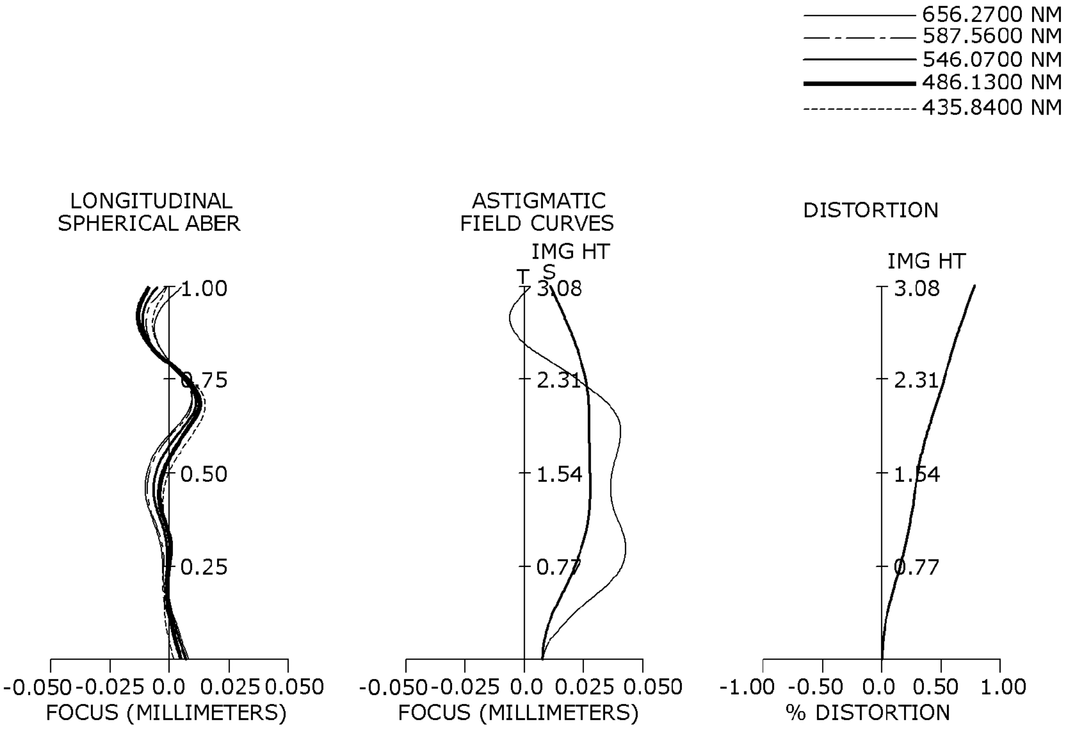
FIG. 7C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the second embodiment of the present invention.

FIG. 7C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the second embodiment of the present invention.

Referring to FIGS. 7A to 7C, it can be seen that the longitudinal spherical aberration is within a range of −0.013 mm to 0.025 mm from a center to an edge of the image sensor regardless of the wavelength. Specifically, it can be seen that the longitudinal spherical aberration is within a range of approximately −0.01 mm to 0.025 mm in the wide mode, and is within a range of −0.013 mm to 0.02 mm in the middle mode. It can be seen that the longitudinal spherical aberration is within a range of −0.013 mm to 0.02 mm in the telephoto.

Referring to FIGS. 7A to 7C, it can be seen that the astigmatic field curve is within a range of −0.03 mm to 0.04 mm from the center to the edge of the image sensor regardless of the wavelength. Specifically, it can be seen that the astigmatic field curve is within a range of approximately −0.025 mm to 0.02 mm in the wide mode, and is within a range of −0.03 mm to 0.025 mm in the middle mode. It can be seen that the astigmatic field curve is within a range of approximately −0.01 mm to 0.04 mm in the telephoto.

Referring to FIGS. 7A to 7C, it can be seen that the distortion is within a range of −0.4% to 0.8% from the center to the edge of the image sensor regardless of the wavelength. Specifically, it can be seen that the distortion is within a range of approximately −0.4% to 0.2% in the wide mode, and is within a range of 0% to 0.3% in the middle mode. It can be seen that the distortion is within a range of approximately 0% to 0.8% in the telephoto.

Next, MTF simulation results of the zoom optical system according to the embodiment of the present invention will be described with reference to FIGS. 8A and 8B. The MTF refers to one of methods for measuring the performance of an optical system.

Figure 8A:
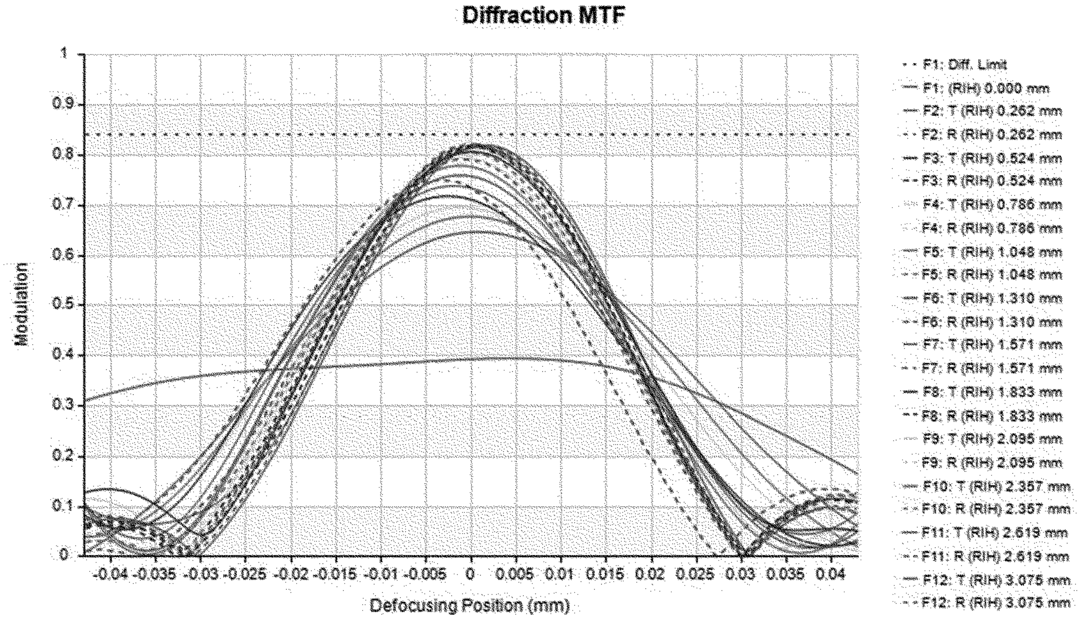
FIG. 8A is a diffraction MTF graph of the optical system in the wide angle according to the embodiment.

FIG. 8A is a diffraction MTF graph of the optical system in the wide angle according to the embodiment. FIG. 8B is a diffraction MTF graph of the optical system in the telephoto according to the embodiment.

Figure 8B:
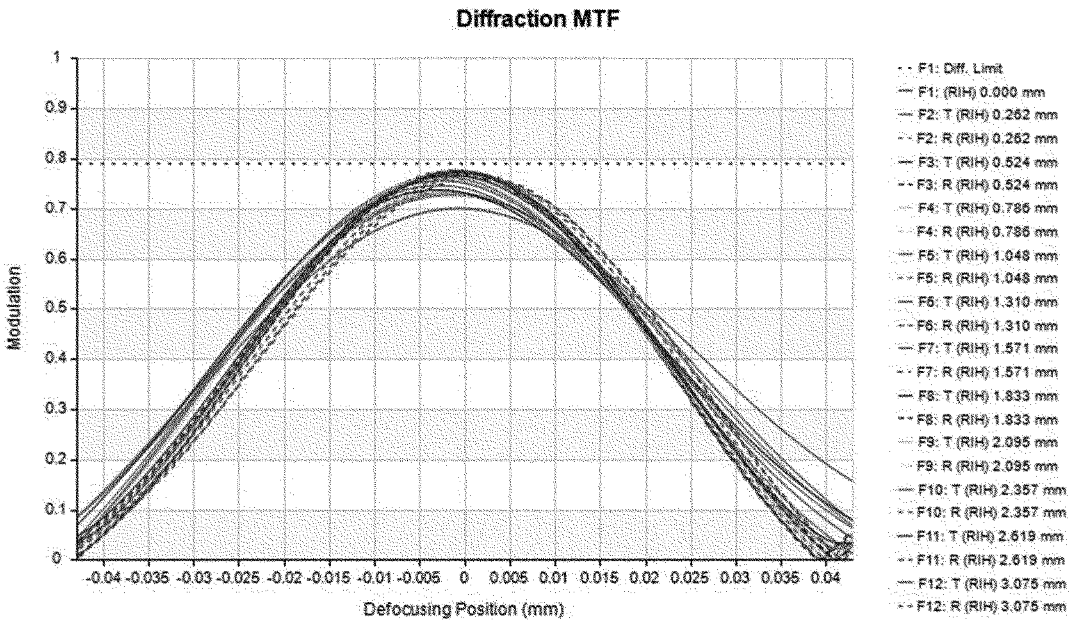
FIG. 8B is a diffraction MTF graph of the optical system in the telephoto according to the embodiment.

Referring to FIGS. 8A and 8B, it can be seen that the zoom optical system according to the embodiment of the present invention has a value close to a diffraction limit, which is a limit value, near a defocusing position (0 mm) in each of the wide angle and the telephoto.

Figure 9A:
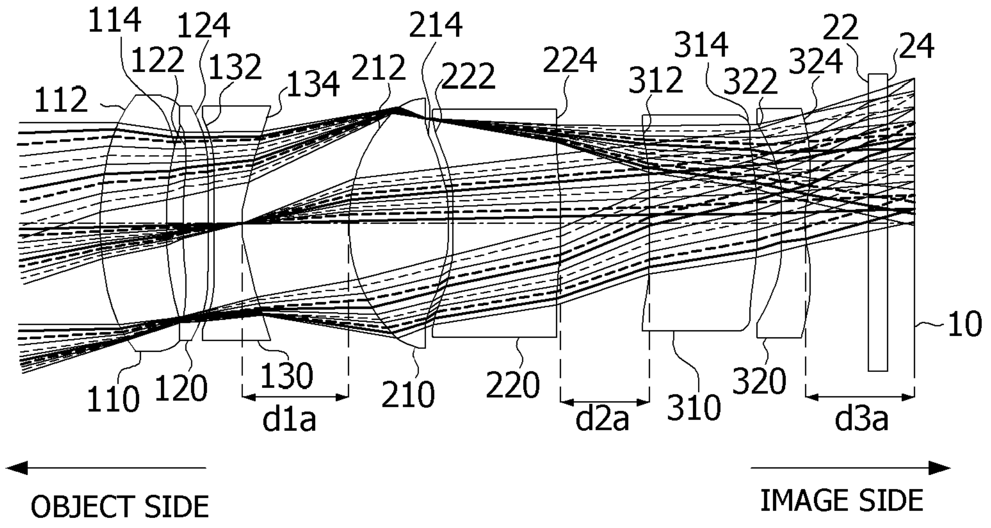
FIG. 9A is a cross-sectional view of a zoom optical system in a wide angle according to a third embodiment of the present invention.
Figure 9B:
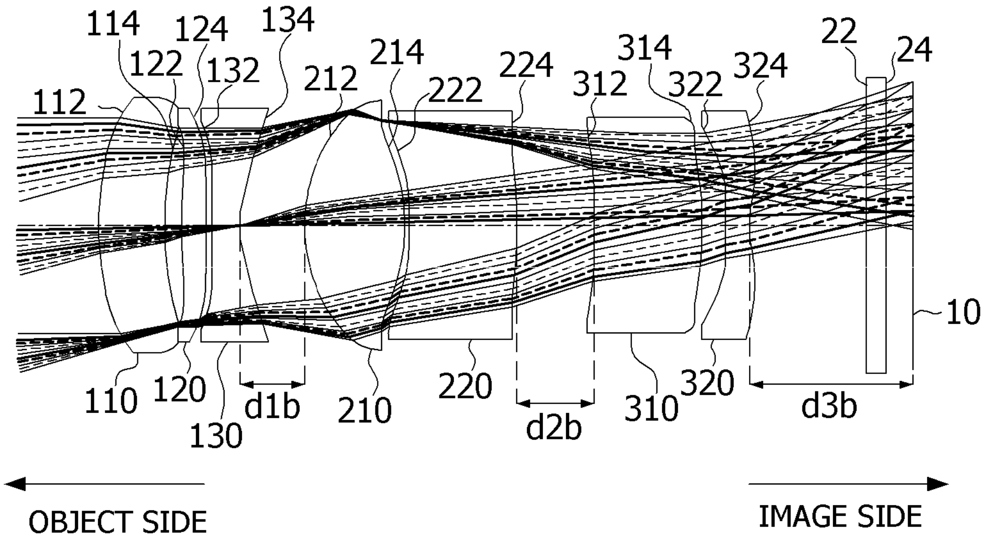
FIG. 9B is a cross-sectional view of the zoom optical system in a middle mode according to the third embodiment of the present invention.
Figure 9C:
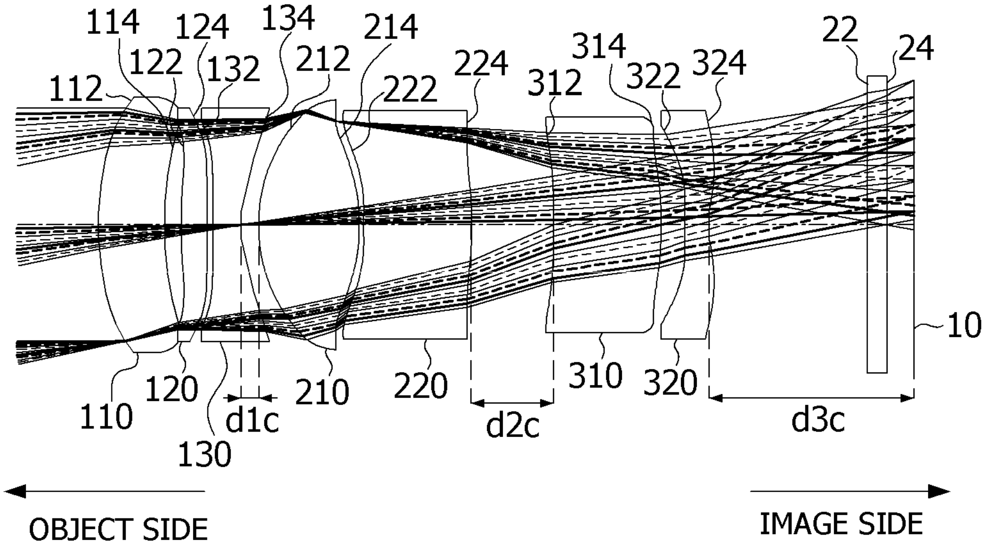
FIG. 9C is a cross-sectional view of the zoom optical system in a telephoto according to the third embodiment of the present invention.

FIG. 9A is a cross-sectional view of a zoom optical system in a wide angle according to a third embodiment of the present invention, FIG. 9B is a cross-sectional view of the zoom optical system in a middle mode according to the third embodiment of the present invention, and FIG. 9C is a cross-sectional view of the zoom optical system in a telephoto according to the third embodiment of the present invention.

Tables 10 and 11 below show optical properties of lenses included in the zoom optical system according to the third embodiment of the present invention, and Tables 12 and 13 show Conic constants and aspheric coefficients of the lenses included in the zoom optical system according to the third embodiment of the present invention.

TABLE 10

| Lens No. | Lens surface No. | Radius of curvature (R, mm) | Thickness (mm) | Material | Refractive index |
|---|---|---|---|---|---|
| First lens | 112 | 8.01877 | 1.42832 | Plastic | 1.5445 |
| | 114 | 11.9473 | 0.36246 | | |
| Second lens | 122 | 15.635 | 0.52835 | Plastic | 1.661 |
| | 124 | 65.9317 | 0.118569 | | |
| Third lens | 132 | 9.80772 | 0.613063 | Plastic | 1.5445 |
| | 134 | 2.52792 | 2.29633(0.4) | | |
| Fourth lens | 212 | 3.40991 | 2.19892 | Plastic | 1.5348 |
| | 214 | −3.6266 | 0.1 | | |
| Fifth lens | 222 | −5.12044 | 2.3 | Plastic | 1.661 |
| | 224 | −13.3444 | 1.94114(1.7963) | | |
| Sixth lens | 312 | −7.78876 | 2.3 | Plastic | 1.614 |
| | 314 | −8.79954 | 0.49294 | | |
| Seventh lens | 322 | 17.2122 | 0.551825 | Plastic | 1.5445 |
| | 324 | 3.79733 | 2.35546(4.39663) | | |
| Filter | 22 | | | | |
| | 24 | | | | |
| Sensor | 10 | | | | |

TABLE 11

| Lens No. | Lens surface No. | Abbe number | Shape | Semmi-aperture |
|---|---|---|---|---|
| First lens | 112 | 55.96 | Convex | 2.5 |
| | 114 | | Convex | 2.2504 |
| Second lens | 122 | 20.4 | Convex | 2.2579 |
| | 124 | | Convex | 2.2743 |
| Third lens | 132 | 55.96 | Convex | 2.2376 |
| | 134 | | Convex | 2.2737 |
| Fourth lens | 212 | 55.70 | Convex | 2.4721 |
| | 214 | | Concave | 2.2530 |
| Fifth lens | 222 | 20.4 | Concave | 2.2139 |
| | 224 | | Concave | 2.1148 |
| Sixth lens | 312 | 25.9 | Concave | 2.0706 |
| | 314 | | Concave | 2.1236 |
| Seventh lens | 322 | 55.96 | Convex | 2.1023 |
| | 324 | | Convex | 2.3496 |
| Filter | 22 | 54.47 | | 2.7940 |
| | 24 | | | 2.8826 |
| Sensor | 10 | | | |

TABLE 12

| Lens surface No. | Conic constant (K) | A | B | C | D |
|---|---|---|---|---|---|
| 112 | 0 | 3.88E−03 | −2.23E−04 | 1.31E−04 | −4.85E−05 |
| 114 | 0 | 5.94E−03 | −2.16E−04 | −1.88E−06 | 1.24E−05 |
| 122 | 0 | −3.53E−03 | −4.88E−04 | −1.26E−04 | −1.01E−06 |
| 124 | 0 | −3.95E−03 | −1.14E−03 | 2.91E−05 | 7.26E−06 |
| 132 | −188.367 | −1.25E−02 | −1.09E−02 | 1.08E−02 | −5.62E−03 |
| 134 | −7.24875 | 3.14E−03 | −1.04E−02 | 8.62E−03 | −4.40E−03 |
| 212 | −5.21E−02 | −2.20E−03 | 1.07E−03 | −9.55E−04 | 5.46E−04 |
| 214 | −1.73209 | −4.38E−03 | 5.21E−03 | −1.09E−03 | −5.31E−04 |
| 222 | 2.128511 | −5.14E−03 | 5.48E−03 | −1.82E−03 | 4.35E−04 |
| 224 | 1.955954 | −3.92E−04 | 1.25E−03 | −1.12E−03 | 1.11E−03 |
| 312 | 10.82257 | 1.20E−02 | −1.15E−03 | 2.80E−04 | −1.38E−05 |
| 314 | 12.83901 | −1.26E−03 | 4.41E−03 | −1.13E−03 | 1.19E−06 |
| 322 | 60.21748 | −9.62E−02 | 3.06E−02 | −4.83E−03 | −2.09E−03 |
| 324 | 0.288197 | −9.44E−02 | 3.85E−02 | −1.40E−02 | 3.84E−03 |

TABLE 13

| Lens surface No. | E | F | G | H | J |
|---|---|---|---|---|---|
| 112 | 1.15E−05 | −9.42E−07 | −1.53E−07 | 3.79E−08 | −2.22E−09 |
| 114 | −7.28E−06 | 6.44E−07 | −1.21E−07 | 2.99E−08 | −2.77E−09 |
| 122 | −1.61E−06 | −1.13E−06 | 1.49E−07 | 2.52E−08 | −1.18E−09 |
| 124 | 8.27E−07 | −1.72E−06 | −1.35E−07 | 1.04E−07 | −7.07E−09 |
| 132 | 1.88E−03 | −4.06E−04 | 5.35E−05 | −3.88E−06 | 1.19E−07 |
| 134 | 1.50E−03 | −3.40E−04 | 4.90E−05 | −4.07E−06 | 1.49E−07 |
| 212 | −1.91E−04 | 4.09E−05 | −5.00E−06 | 2.95E−07 | −4.20E−09 |
| 214 | 5.54E−04 | −2.22E−04 | 4.90E−05 | −5.81E−06 | 2.93E−07 |
| 222 | −3.84E−05 | −1.07E−05 | 3.74E−06 | −4.40E−07 | 2.05E−08 |
| 224 | −6.51E−04 | 2.38E−04 | −5.30E−05 | 6.55E−06 | −3.45E−07 |
| 312 | 1.93E−05 | −8.20E−06 | 1.06E−06 | 3.90E−08 | −9.59E−09 |
| 314 | 7.54E−05 | −1.23E−06 | −2.19E−06 | −9.06E−08 | 3.29E−08 |
| 322 | 1.63E−03 | −4.27E−04 | 4.63E−05 | −3.62E−07 | −2.42E−07 |
| 324 | −7.19E−04 | 8.68E−05 | −6.21E−06 | 1.77E−07 | 3.03E−09 |

Referring to FIGS. 9A to 9C and Tables 10 to 13, the zoom optical system includes a first lens group 100, a second lens group 200, and a third lens group 300, which are sequentially arranged from an object side to an image side. The first lens group 100 includes a first lens 110, a second lens 120, and a third lens 130, which are sequentially arranged from the object side to the image side. The second lens group 200 includes a fourth lens 210 and a fifth lens 220 sequentially arranged from the object side to the image side. The third lens group 300 includes a sixth lens 310 and a seventh lens 320 sequentially arranged from the object side to the image side. In Table 10, a thickness [mm] denotes a distance from each lens surface to the next lens surface.

For example, a thickness written to an object side surface 112 of the first lens 110 denotes a distance from the object side surface 112 of the first lens 110 to an image side surface 114 of the first lens 110. Specifically, the thickness written to the object side surface 112 of the first lens 110 denotes a distance between a center of a curvature of the object side surface 112 of the first lens 110 to a center of a curvature of the image side surface 114.

A thickness written to the image side surface 114 of the first lens 110 denotes a distance from the image side surface 114 of the first lens 110 to an object side surface 122 of the second lens 120. Specifically, the thickness written to the image side surface 114 of the first lens 110 denotes a distance between a center of a curvature of the image side surface 114 of the first lens 110 and a center of a curvature of the object side surface 122 of the second lens 120.

A thickness written to an image side surface 134 of the third lens 130 denotes a distance from the image side surface 134 of the third lens 130 to an object side surface 212 of the fourth lens 210. Specifically, the thickness written to the image side surface 134 of the third lens 130 denotes a distance between a center of a curvature of the image side surface 134 of the third lens 130 and a center of a curvature of the object side surface 212 of the fourth lens 210.

In this case, the second lens group 200 moves in a process of zooming from the wide angle to the telephoto, and thus the thickness written to the image side surface 134 of the third lens 130 may be changed. The thickness written to the image side surface 134 of the third lens 130 may have a value between the longest distance and the shortest distance. Referring to Table 10, the thickness written to the image side surface 134 of the third lens 130 may have the longest distance of 2.29633 in the wide angle. The thickness written to the image side surface 134 of the third lens 130 may have a value between the shortest distance and the longest distance in the middle mode. The thickness written to the image side surface 134 of the third lens 130 may have the shortest distance of 0.4 in the telephoto. Thicknesses written to image side surfaces of the fifth lens 220 and the seventh lens 320 are also equal.

Referring to Table 11, each surface of the first to seventh lenses 110 to 320 may be implemented in a convex or concave shape.

The first lens 110 may be a lens in which the object side surface 112 is convex toward the object side. The first lens

110 may be a lens in which the image side surface 114 is convex toward the object side. The second lens 120 may be a lens in which the object side surface 122 is convex toward the object side. The second lens 120 may be a lens in which the image side surface 124 is convex toward the object side. The third lens 130 may be a lens in which an object side surface 132 is convex toward the object side. The third lens 130 may be a lens in which the image side surface 134 is convex toward the object side.

The fourth lens 210 may be a lens in which the object side surface 212 is convex toward the object side. The fourth lens 210 may be a lens in which an image side surface 214 is concave toward the object side. The fifth lens 220 may be a lens in which an object side surface 222 is concave toward the object side. The fifth lens 220 may be a lens in which the image side surface 224 is concave toward the object side.

Meanwhile, when a distance between the first lens group 100 and the second lens group 200 is the smallest distance (i.e., in the telephoto), the center of the curvature of the object side surface 212 of the fourth lens 210 may be located closer to the image side than both ends of the image side surface 134 of the third lens 130.

The sixth lens 310 may be a lens in which an object side surface 312 is concave toward the object side. The sixth lens 310 may be a lens in which an image side surface 314 is concave toward the object side. The seventh lens 320 may be a lens in which an object side surface 322 is convex toward the object side. The seventh lens 320 may be a lens in which an image side surface 324 is convex toward the object side.

Referring to FIG. 9A, when the distance between the first lens group 100 and the second lens group 200 is d1*a*, a distance between the second lens group 200 and the third lens group 300 is d2*a*, and a distance between the third lens group 300 and the image sensor 10 is d3*a*, the zoom optical system may have the wide angle (e.g., a magnification of 3 times). That is, when the distance between the center of the curvature of the image side surface 134 of the third lens 130 and the center of the curvature of the object side surface 212 of the fourth lens 210 is d1*a*, the distance between the center of the curvature of the image side surface 224 of the fifth lens 220 and the center of the curvature of the object side surface 312 of the sixth lens 310 is d2*a*, and the distance between the center of the curvature of the image side surface 324 of the seventh lens 320 and the image sensor 10 is d3*a*, the zoom optical system may have the wide angle.

In FIG. 9B, when the distance between the first lens group 100 and the second lens group 200 is d1*b*, the distance between the second lens group 200 and the third lens group 300 is d2*b*, and the distance between the third lens group 300 and the image sensor 10 is d3*b*, the zoom optical system may have the middle mode. That is, when the distance between the center of the curvature of the image side surface 134 of the third lens 130 and the center of the curvature of the object side surface 212 of the fourth lens 210 is d1*b*, the distance between the center of the curvature of the image side surface 224 of the fifth lens 220 and the center of the curvature of the object side surface 312 of the sixth lens 310 is d2*b*, and the distance between the center of the curvature of the image side surface 324 of the seventh lens 320 and the image sensor 10 is d3*b*, the zoom optical system may have the middle mode.

In FIG. 9C, when the distance between the first lens group 100 and the second lens group 200 is d1*c*, the distance between the second lens group 200 and the third lens group 300 is d2*c*, and the distance between the third lens group 300 and the image sensor 10 d3*c*, the zoom optical system may have the telephoto (e.g., a magnification of 5 times). That is, when the distance between the center of the curvature of the image side surface 134 of the third lens 130 and the center of the curvature of the object side surface 212 of the fourth lens 210 is d1*c*, the distance between the center of the curvature of the image side surface 224 of the fifth lens 220 and the center of the curvature of the object side surface 312 of the sixth lens 310 is d2*c*, and when the distance between the center of the curvature of the image side surface 324 of the seventh lens 320 and the image sensor 10 is d3*c*, the zoom optical system may have the telephoto.

The distance between adjacent lens groups may be changed in a process of changing the magnification from the wide angle to the telephoto.

The distance between the first lens group 100 and the second lens group 200 may be changed from d1*a* to d1*c* via d1*b*. Referring to Table 10, the distance d1*a* between the first lens group 100 and the second lens group 200 in the wide angle is 2.29633 mm. The distance d1*c* between the first lens group 100 and the second lens group 200 in the telephoto is 0.4 mm. As described above, the distance between the first lens group 100 and the second lens group 200 may be changed from 2.29633 mm to 0.4 mm in the process of changing the magnification from the wide angle to the telephoto via the middle mode. That is, the distance between the first lens group 100 and the second lens group 200 may be gradually reduced in the process of changing the magnification from the wide angle to the telephoto (d1*a*>d1*b*>d1*c*). An amount by which the distance between the first lens group 100 and the second lens group 200 increases may be gradually reduced in the process of changing the magnification from the wide angle to the telephoto.

The distance between the second lens group 200 and the third lens group 300 may be changed from d2*a* to d2*c* via d2*b*. Referring to Table 10, the distance d2*a* between the second lens group 200 and the third lens group 300 in the wide angle is 1.94114 mm. The distance d1*c* between the second lens group 200 and the third lens group 300 in the telephoto is 1.7963 mm. As described above, the distance between the second lens group 200 and the third lens group 300 may be changed from 1.94114 mm to 1.7963 mm in the process of changing the magnification from the wide angle to the telephoto via the middle mode. That is, the distance between the second lens group 200 and the third lens group 300 may be reduced in the process of changing the magnification from the wide angle to the telephoto (d2*a*>d2*b*>d2*c*). In this case, an amount by which the distance between the second lens group 200 and the third lens group 300 increases may be gradually reduced in the process of changing the magnification from the wide angle to the telephoto.

The distance between the third lens group 300 and the image sensor 10 may be changed from d3*a* to d3*c* via d3*b*. Referring to Table 10, the distance d3*a* between the third lens group 300 and the image sensor 10 in the wide angle is 2.35546 mm. The distance d3*c* between the third lens group 300 and the image sensor 10 in the telephoto is 4.639663 mm. As described above, the distance between the third lens group 300 and the image sensor 10 may be changed from 2.35546 mm to 4.639663 mm in the process of changing the magnification from the wide angle to the telephoto via the middle mode. The distance between the third lens group 300 and the image sensor 10 may gradually increase in the process of changing the magnification from the wide angle to the telephoto (d3*a*<d3*b*<d3*c*). However, an amount by which the distance between the third lens group 300 and the image sensor 10 increases may be gradually reduced in the process of changing the magnification from the wide angle to the telephoto.

The second lens group 200 and the third lens group 300 may have different moving speeds.

As the second lens group 200 and the third lens group 300 move, the magnification of the zoom optical system may be continuously adjusted from a magnification of 3 times to a magnification of 5 times.

Next, simulation results of longitudinal spherical aberrations, astigmatic field curves, and a distortion of the zoom optical system according to the third embodiment of the present invention will be described with reference to FIGS. 10A to 10C. The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface.

Figure 10A:
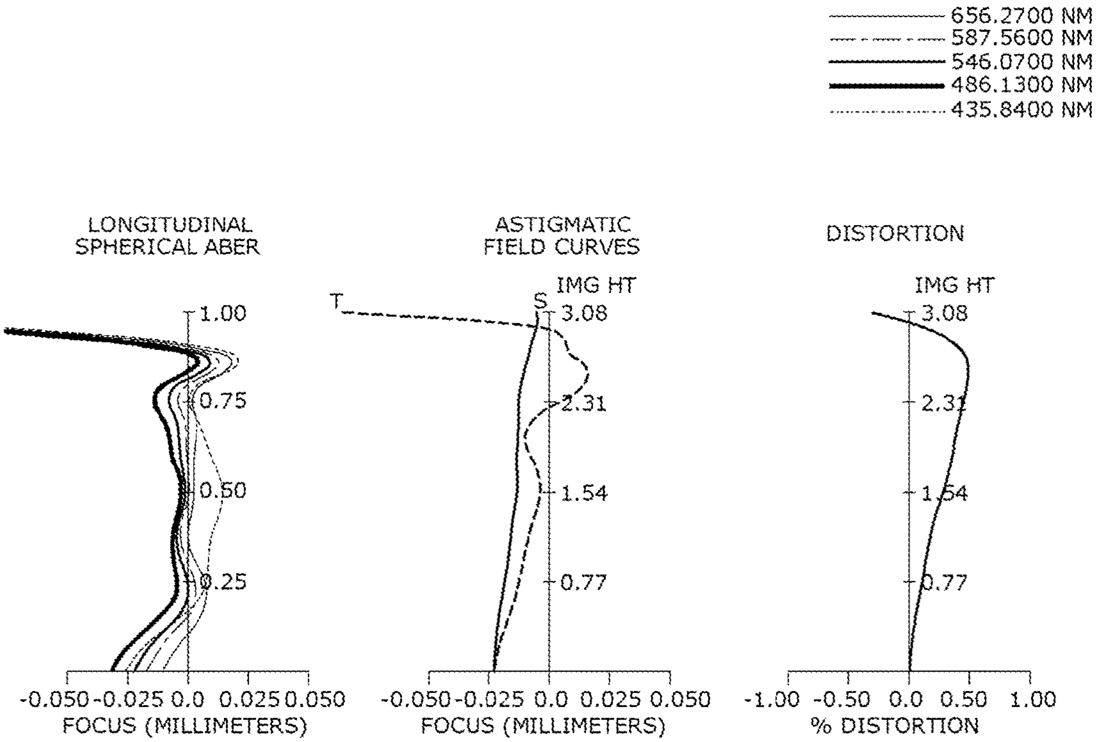
FIG. 10A is a graph measuring longitudinal spherical aberrations, astigmatic field curves, and a distortion in the optical system in the wide angle for light of wavelengths of 435 nm, 486 nm, 546 nm, 587 nm, and 656 nm according to the third embodiment of the present invention.

FIG. 10A is a graph measuring the longitudinal spherical aberrations, the astigmatic field curves, and the distortion in the optical system in the wide angle for light of wavelengths of 435 nm, 486 nm, 546 nm, 587 nm, and 656 nm according to the third embodiment of the present invention.

Figure 10B:
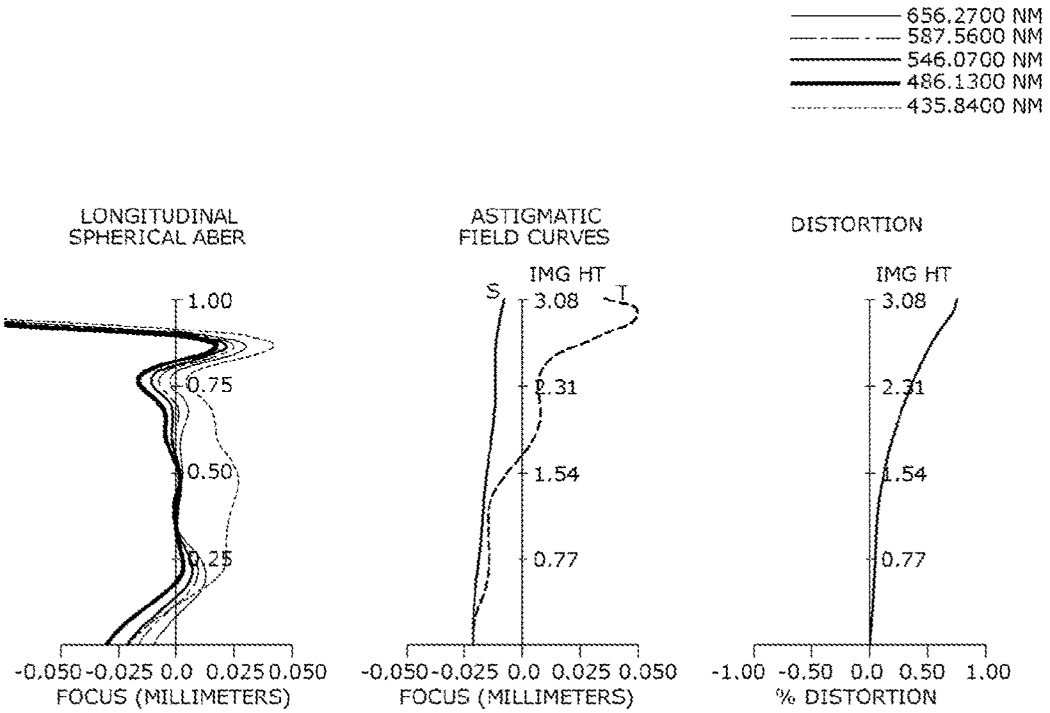
FIG. 10B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the third embodiment of the present invention.

FIG. 10B is a graph measuring the longitudinal spherical aberrations, the astigmatic field curves, and the distortion in the optical system in the middle mode for the light of wavelengths of 435 nm, 486 nm, 546 nm, 587 nm, and 656 nm according to the third embodiment of the present invention.

Figure 10C:
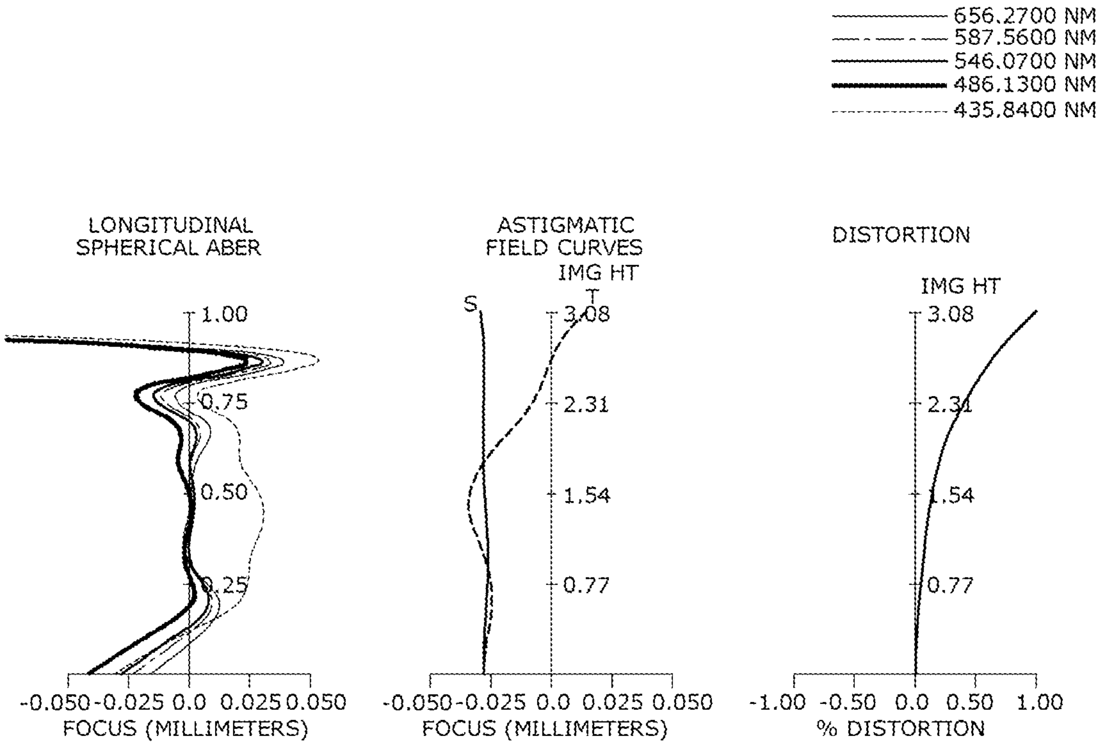
FIG. 10C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the third embodiment of the present invention.

FIG. 10C is a graph measuring the longitudinal spherical aberrations, the astigmatic field curves, and the distortion in the optical system in the telephoto for the light of wavelengths of 435 nm, 486 nm, 546 nm, 587 nm, and 656 nm according to the third embodiment of the present invention.

Referring to FIGS. 10A to 10C, it can be seen that the longitudinal spherical aberration is within 0.055 mm from a center to an edge of the image sensor regardless of the wavelength. Specifically, it can be seen that the longitudinal spherical aberration is within approximately 0.025 mm in the wide mode, and is within 0.040 mm in the middle mode. It can be seen that the longitudinal spherical aberration is within 0.055 mm in the telephoto.

Referring to FIGS. 10A to 10C, it can be seen that the astigmatic field curve is within a range of −0.035 mm to 0.050 mm from the center to the edge of the image sensor regardless of the wavelength. Specifically, it can be seen that the astigmatic field curve is within a range of approximately −0.025 mm to 0.020 mm in the wide mode although the astigmatic field curve is out of range at the edge of the image sensor, and is within a range of −0.025 mm to 0.050 mm in the middle mode. It can be seen that the astigmatic field curve is within a range of approximately −0.035 mm to 0.020 mm in the telephoto.

Referring to FIGS. 10A to 10C, it can be seen that the distortion is within a range of −0.4% to 1% from the center to the edge of the image sensor regardless of the wavelength. Specifically, it can be seen that the distortion is within a range of approximately −0.4% to 0.5% in the wide mode, and is within a range of 0% to 0.75% in the middle mode. It can be seen that the distortion is within a range of approximately 0% to 1% in the telephoto.

Next, MTF simulation results of the zoom optical system according to the embodiment of the present invention will be described with reference to FIGS. 11A and 11B. The MTF refers to one of methods for measuring the performance of an optical system.

Figure 11A:
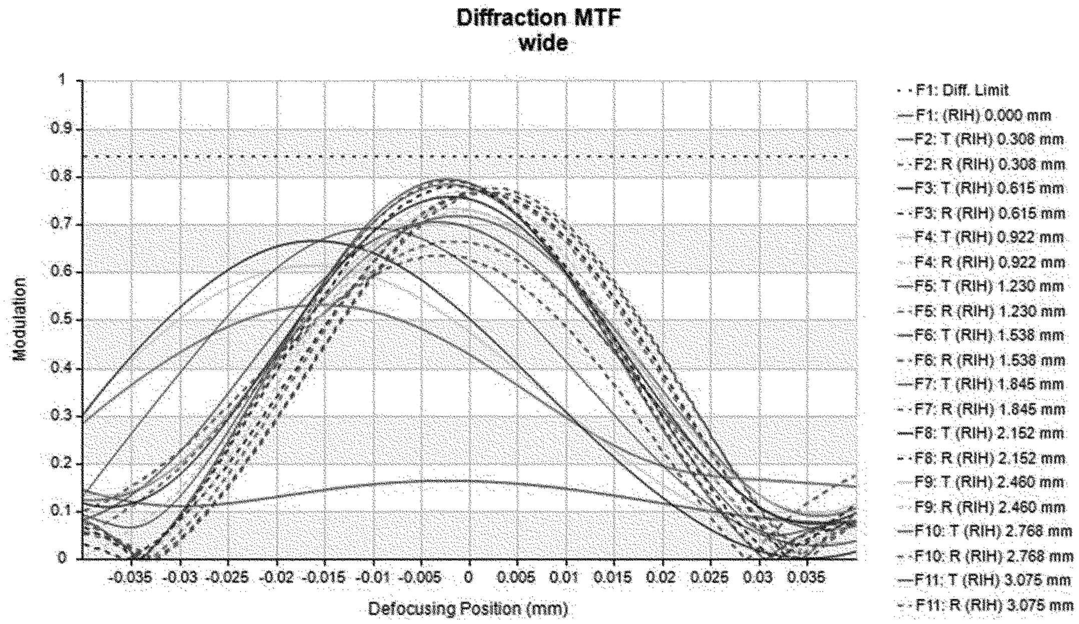
FIG. 11A is a diffraction MTF graph of the optical system in the wide angle according to the embodiment.

FIG. 11A is a diffraction MTF graph of the optical system in the wide angle according to the embodiment. FIG. 11B is a diffraction MTF graph of the optical system in the telephoto according to the embodiment.

Figure 11B:
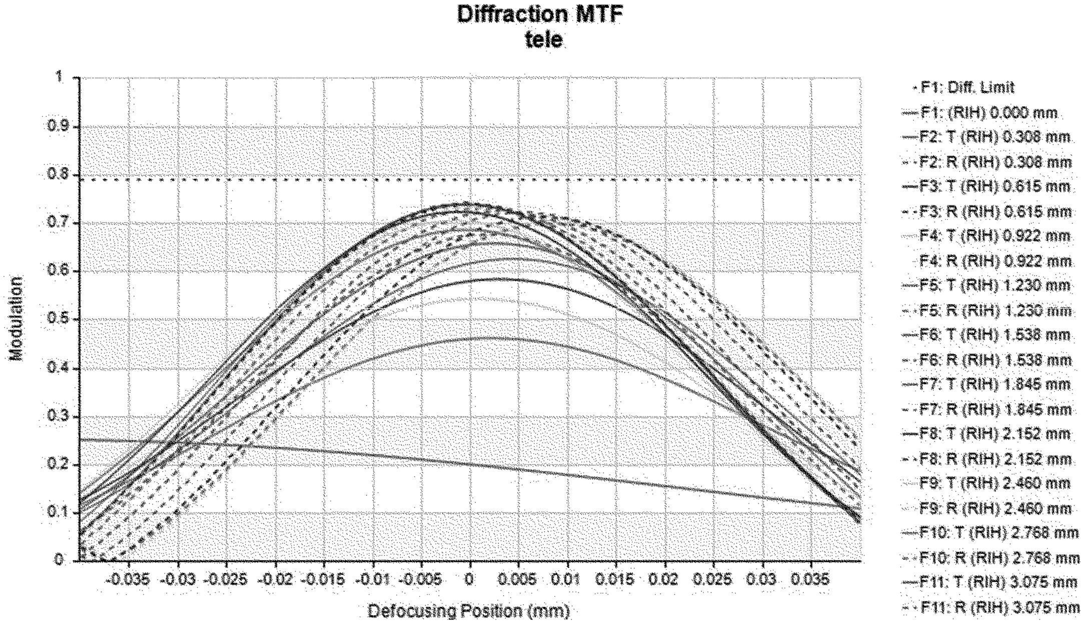
FIG. 11B is a diffraction MTF graph of the optical system in the telephoto according to the embodiment.

Referring to FIGS. 11A and 11B, it can be seen that the zoom optical system according to the embodiment of the present invention has a value close to a diffraction limit, which is a limit value, near a defocusing position (0 mm) in each of the wide angle and the telephoto.

Figure 12:
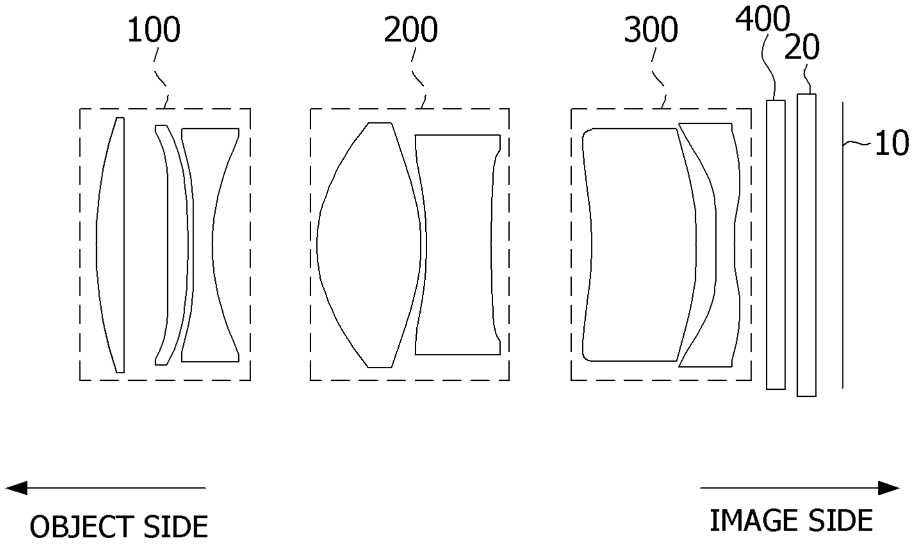
FIG. 12 is a view illustrating a zoom optical system according to one embodiment of the present invention.

FIG. 12 is a view illustrating a zoom optical system according to one embodiment of the present invention.

The zoom optical system illustrated in FIG. 12 may further include a dummy lens in the zoom optical system described with reference to FIG. 1.

Referring to FIG. 12, the zoom optical system according to the embodiment of the present invention may include a first lens group, a second lens group, a third lens group, a filter, and a sensor, which are sequentially disposed from an object side, and a dummy lens may be further included between the third lens group and the filter.

A width of the dummy lens may be greater than that of the first lens group. An effective diameter of the dummy lens may be greater than an effective diameter of the first lens group. The effective diameter of the dummy lens may be greater than an effective diameter of each lens included in the first lens group.

The dummy lens may be fixed. The dummy lens may be fixed with respect to an image side.

The dummy lens may be referred to as a fourth lens group. The dummy lens may include one lens, but is not limited thereto, and may include a plurality of lenses.

The dummy lens may serve to block foreign materials that may be introduced when the second lens group and the third lens group move. The dummy lens may inhibit the introduced foreign materials from being introduced into the sensor.

Figure 13:
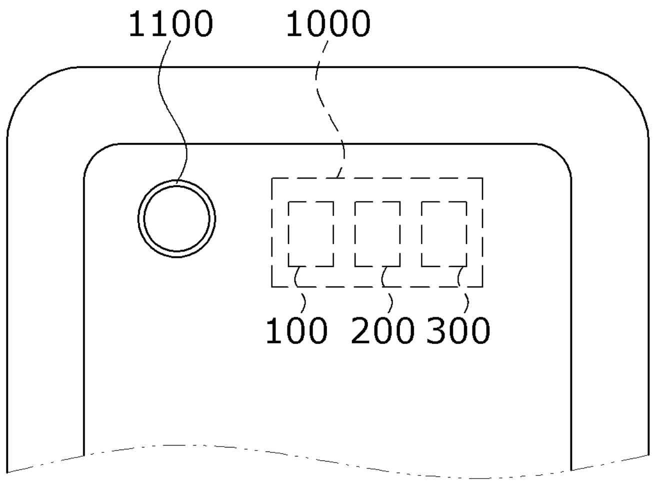
FIG. 13 is a view illustrating a portion of a portable terminal to which the camera module according to one embodiment of the present invention is applied.

FIG. 13 is a view illustrating a portion of a portable terminal to which the camera module according to one embodiment of the present invention is applied.

Meanwhile, the zoom optical system according to the embodiment of the present invention may be applied to a camera module. The camera module including the zoom optical system according to one embodiment of the present invention may be installed in a portable terminal and applied thereto together with a main camera module. The camera module according to the embodiment of the present invention may include the image sensor, the filter disposed on the image sensor, and the zoom optical system disposed on the filter, and the zoom optical system according to the embodiment of the present invention may include the first lens group 100, the second lens group 200, and the third lens group 300, which are described above. The portable terminal, in which the camera module including the zoom optical system according to the embodiment of the present invention is installed, may be a smartphone, a tablet personal computer (PC), a laptop computer, a personal digital assistant (PDA), or the like. The optical system according to the embodiment of the present invention may be applied to the camera module.

Referring to FIG. 13, a camera module including a zoom optical system 1000 according to one embodiment of the present invention may be installed in a portable terminal and may be applied thereto together with a main camera module 1100.

The zoom optical system 1000 according to the embodiment of the present invention may include the first lens group 100, the second lens group 200, and the third lens group 300, which are described above, and the first lens group 100, the second lens group 200, and the third lens group 300 may be sequentially disposed in a lateral direction of the portable terminal due to the limitation of a thickness of the portable terminal. To this end, as described above, the right-angle prism may be further disposed in front of the first lens group 100. When the zoom optical system is disposed in a thickness direction of the portable terminal, that is, the lens surfaces of the lenses included in the zoom optical system are disposed in the thickness direction of the portable terminal, diameters of the lenses included in the zoom optical system may be reduced in size, so that the thickness of the portable terminal is reduced. Accordingly, the zoom optical system allowing a magnification to be continuously adjusted by moving the lenses may also be installed in the portable terminal.

The portable terminal, in which the camera module including the zoom optical system according to the embodiment of the present invention is installed, may be a smartphone, a tablet PC, a laptop computer, a PDA, or the like.

A zoom optical system according to an embodiment of the present invention includes a first lens group, a second lens group, and a third lens group, which are sequentially aligned from an object side to an image side, wherein the second lens group and third lens group are movable, and an effective focal length in a wide angle is defined by the following equation, $$2.9 < \frac{EFL_{wide}}{H_{image\,D}} < 3.5$$

where, $EFL_{wide}$ refers to the effective focal length of the zoom optical system in the wide angle, and $H_{imageD}$ refers to a half value of a diagonal length of an image sensor pixel area.

The first lens group may include three or less lenses, the second lens group may include two or less lenses, and the third lens group may include two or less lenses.

An effective focal length in a telephoto may be defined by the following equation, $$4.3 < \frac{EFL_{tele}}{H_{imageD}} < 5.1$$

where, $EFL_{tele}$ refers to the effective focal length of the zoom optical system in the telephoto, and $H_{imageD}$ refers to the half value of the diagonal length of the image sensor pixel area.

During zooming from the wide angle to the telephoto, a movement stroke of the second lens group may be defined by the following equation, $$8 < \frac{TTL}{\mathrm{STROKE}_2} < 9$$

where, TTL refers to a distance from a surface of an image sensor to a first surface of the zoom optical system, and $\mathrm{STROKE}_2$ refers to the movement stroke of the second lens group.

During zooming from the wide angle to the telephoto, a movement stroke of the third lens group may be defined by the following equation, $$6 < \frac{TTL}{\mathrm{STROKE}_3} < 7$$

where, TTL refers to the distance from the surface of the image sensor to the first surface of the zoom optical system, and $\mathrm{STROKE}_3$ refers to the movement stroke of the third lens group.

Each of the first to third lens groups may include a plastic lens.

A maximum diameter of a plurality of lenses included in the first lens group, and a maximum diameter of a plurality of lenses included in the second lens group and the third lens group may be defined by the following equation, $$0.85 < \frac{APER_{fix}}{APER_{mov}} < 1.1$$

where, $APER_{fix}$ may refer to the maximum diameter of the lens included in the first lens group, which is a fixed group, and $APER_{mov}$ may refer to the maximum diameter of the lens included in the second lens group and the third lens group which are moving groups.

A CRA may be greater than −20° and less than −10°.

A right-angle prism disposed in front of the first lens group may be further included.

A dummy lens disposed in rear of the third lens group may be further included.

An effective diameter of the dummy lens may be greater than an effective diameter of the first lens group.

A zoom optical system according to an embodiment of the present invention includes a first lens group, a second lens group, and a third lens group, which are sequentially arranged from an object side to an image side, wherein the second lens group and the third lens group are movable, and an effective focal length in a telephoto is defined by the following equation, $$4.3 < \frac{EFL_{tele}}{H_{image\,D}} < 5.1$$

where, $EFL_{tele}$ refers to the effective focal length of the zoom optical system in the telephoto, and $H_{imageD}$ refers to a half value of a diagonal length of an image sensor pixel area.

A zoom optical system according to an embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, a movement stroke of the second lens group is less than 2 mm, and in a state in which a distance from a surface of an image sensor to a first surface of the zoom optical system is less than 17 mm, the zoom optical system is defined by the following equation in corresponding to the movement stroke of the second lens group, which is less than 2 mm, $$1.3 < \frac{EFL_{tele}}{EFL_{wide}} < 1.7$$

where, $EFL_{tele}$ refers to an effective focal length in a telephoto, and $EFL_{wide}$ refers to an effective focal length in a wide angle.

A zoom optical system according to an embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, a focal length is greater than 14 mm in a telephoto, and the f-number is less than 3 in the telephoto.

A zoom optical system according to an embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, a focal length is less than 10 mm in a wide angle, and the f-number is less than 2.3 in the wide angle.

A zoom optical system according to an embodiment of the present invention includes a first lens group, a second lens group, and a third lens group, which are sequentially arranged from an object side to an image side, wherein the first lens group is fixed, the second lens group and the third lens group are movable, the second lens group performs a zoom function, the third lens group performs a focusing function, and a diagonal length of a pixel area of an image sensor disposed in rear of the third lens group is greater than 6 mm.

While the embodiments have been mainly described, they are only examples and do not limit the present invention, and it may be known to those skilled in the art that various modifications and applications, which have not been described above, may be made without departing from the essential properties of the embodiments. For example, components specifically described in the embodiments may be modified and implemented. In addition, it should be understood that differences related to modifications and applications fall within the scope of the present invention defined by the appended claims.

We claim:

1. A zoom optical system comprising a first lens group, a second lens group, and a third lens group sequentially arranged from an object side to an image side, wherein the second lens group and the third lens group are movable, wherein the first lens group includes a first lens, a second lens, and a third lens, which are sequentially arranged from the object side to the image side, wherein the first lens has an object side surface convex toward the object side, and an image side surface concave toward the object side, and the second lens has an object side surface concave toward the object side, and an image side surface concave toward the object side, and wherein an effective focal length (EFL) in a wide angle is defined by the following equation, $$2.9 < \frac{EFL_{wide}}{H_{imageD}} < 3.5$$

where, EFLwide refers to an effective focal length of a zoom optical system in a wide angle, and $H_{imageD}$ refers to a half value of a diagonal length of an image sensor pixel area, and in a state in which a distance from a surface of an image sensor to a first surface of the object side of the zoom optical system is less than 17 mm and a movement stroke of the second lens group is less than 2 mm, an effective focal length (EFL) in a wide angle and a telephoto are defined by the following equation, $$1.3 < \frac{EFL_{tele}}{EFL_{wide}} < 1.7$$

where, $EFL_{tele}$ refers to an effective focal length of the zoom optical system in a telephoto.

2. The zoom optical system of claim 1, wherein the first lens group includes three or less lenses, the second lens group includes two or less lenses, and the third lens group includes two or less lenses.

3. The zoom optical system of claim 1, wherein an effective focal length in a telephoto is defined by the following equation, $$4.3 < \frac{EFL_{tele}}{H_{imageD}} < 5.1$$

where, $H_{imageD}$ refers to a half value of a diagonal length of an image sensor pixel area.

4. The zoom optical system of claim 1, wherein a movement stroke of the second lens group during zooming from the wide angle to a telephoto is defined by the following equation, $$8 < \frac{TTL}{STROKE_2} < 9$$

where, TTL refers to a distance from a surface of an image sensor to the first surface of the object side of the zoom optical system, and $STROKE_2$ refers to a movement stroke of a second lens group.

5. The zoom optical system of claim 1, wherein a movement stroke of the third lens group during zooming from the wide angle to a telephoto is defined by the following equation, $$6 < \frac{TTL}{STROKE_3} < 7$$

where, TTL refers to a distance from a surface of an image sensor to the first surface of the object side of the zoom optical system, and $STROKE_3$ refers to a movement stroke of a third lens group.

6. The zoom optical system of claim 1, wherein the first to third lens groups include a plastic lens.

7. The zoom optical system of claim 1, wherein a maximum diameter of a plurality of lenses included in the first lens group, and a maximum diameter of a plurality of lenses included in the second lens group and the third lens group are defined by the following equation, $$0.85 < \frac{APER_{fix}}{APER_{mov}} < 1.1$$

where, $APER_{fix}$ refers to the maximum diameter of the lens included in the first lens group, which is a fixed group, and $APER_{mov}$ refers to the maximum diameter of the lens included in the second lens group and the third lens group, which are moving groups.

8. The zoom optical system of claim 1, wherein a chief ray angle (CRA) is greater than −20° and less than −10°.

9. The zoom optical system of claim 1, comprising a right-angle prism disposed in front of the first lens group.

10. The zoom optical system of claim 1, comprising a dummy lens disposed in rear of the third lens group.

11. The zoom optical system of claim 1, wherein the second lens group and the third lens group have different moving speeds.

12. The zoom optical system of claim 1, wherein a filter and an image sensor are sequentially arranged in rear of the third lens group.

13. The zoom optical system of claim 1, wherein the second lens group includes fourth and fifth lenses, and wherein the third lens group includes sixth and seventh lenses.

14. The zoom optical system of claim 1, wherein a plurality of lenses included in the first to third lens groups are a D-cut lens in which a portion of an upper side part and a portion of a lower side part are cut.

15. The zoom optical system of claim 1, wherein in a plurality of lenses included in the first to third lens groups, a major-axis length is longer than a minor-axis length, and the minor-axis length is smaller than a diameter of an effective diameter.

16. The zoom optical system of claim 1, wherein a magnification of the zoom optical system increases or decreases continuously between 3 to 5 times as the second lens group and the third lens group move.

17. The zoom optical system of claim 1, wherein apertures of the second lens group and the third lens group are less than an aperture of the first lens group.

18. The zoom optical system of claim 13, wherein the first lens, the third lens, the fourth lens, and the seventh lens have object side surfaces convex toward the object side, and wherein the fifth lens and the sixth lens have object side surfaces concave toward the object side.

19. The zoom optical system of claim 13, wherein the fourth lens and the fifth lens are sequentially arranged from the object side to the image side, and wherein the sixth lens and the seventh lens are sequentially arranged from the object side to the image side.

20. The zoom optical system of claim 10, wherein an effective diameter of the dummy lens is greater than an effective diameter of the first lens group.

* * * * *